US011209553B2

(12) United States Patent
Linton et al.

(10) Patent No.: US 11,209,553 B2
(45) Date of Patent: Dec. 28, 2021

(54) SYSTEMS AND METHODS FOR ACTIVE SUPPLY CHAIN MONITORING

(71) Applicant: Flex Ltd., Singapore (SG)

(72) Inventors: Thomas K. Linton, Newnan, GA (US); Armando J. Lucrecio, Fremont, CA (US); Frances Mossman, Austin, TX (US); Jannik Olsen, San Jose, CA (US); Christopher Bjorn Kilburn, Menlo Park, CA (US)

(73) Assignee: Flex Ltd., Singapore (SG)

( * ) Notice: Subject to any disclaimer, the term of this patent is extended or adjusted under 35 U.S.C. 154(b) by 0 days.

(21) Appl. No.: 16/665,766

(22) Filed: Oct. 28, 2019

(65) Prior Publication Data
US 2020/0074398 A1    Mar. 5, 2020

Related U.S. Application Data

(63) Continuation of application No. 15/604,485, filed on May 24, 2017, now abandoned.

(60) Provisional application No. 62/482,005, filed on Apr. 5, 2017, provisional application No. 62/477,272, filed on Mar. 27, 2017, provisional application No. 62/340,599, filed on May 24, 2016.

(51) Int. Cl.
| *G01S 19/46* | (2010.01) |
| *G01S 19/16* | (2010.01) |
| *G01S 5/02* | (2010.01) |
| *G06Q 10/08* | (2012.01) |

(52) U.S. Cl.
CPC ............. *G01S 19/46* (2013.01); *G01S 19/16* (2013.01); *G01S 5/0294* (2013.01); *G06Q 10/0833* (2013.01)

(58) Field of Classification Search
CPC ........ G01S 19/16; G01S 19/46; G01S 5/0294; G06Q 10/0833
USPC ........................................ 342/357.29, 357.54
See application file for complete search history.

(56) References Cited

U.S. PATENT DOCUMENTS

| 5,953,707 A | 9/1999 | Huang et al. |
| 6,151,582 A | 11/2000 | Huang et al. |

(Continued)

FOREIGN PATENT DOCUMENTS

| CN | 1691025 | 11/2005 |
| CN | 101291337 | 10/2008 |

(Continued)

OTHER PUBLICATIONS

U.S. Appl. No. 16/559,125, McNamara et al..

(Continued)

*Primary Examiner* — Chuong P Nguyen
(74) *Attorney, Agent, or Firm* — Sheridan Ross P.C.

(57) ABSTRACT

Methods, devices, and systems for tracking an asset are provided. In particular, a device is provided that includes an array of sensors and communications modules configured to detect tracking information, including environmental conditions and physical events, and report the tracking information along with a geographical location of the device to a control server across a wireless network. Upon receiving the tracking information, the control server interprets the information and generates tracking reports for the device configured to be displayed to a graphical user interface of a third-party communication device.

20 Claims, 21 Drawing Sheets

(56) References Cited

U.S. PATENT DOCUMENTS

| | | | |
|---|---|---|---|
| 6,917,328 B2* | 7/2005 | Rabinowitz | G01S 5/0036 |
| | | | 342/357.29 |
| 7,134,096 B2 | 11/2006 | Brathwaite et al. | |
| 7,171,379 B2 | 1/2007 | Menninger et al. | |
| 7,212,829 B1 | 5/2007 | Lau et al. | |
| 7,369,091 B2* | 5/2008 | Man | H01Q 1/2291 |
| | | | 343/702 |
| 7,538,681 B1 | 5/2009 | Sharma et al. | |
| 7,712,058 B2 | 5/2010 | Brathwaite et al. | |
| 7,791,455 B1 | 9/2010 | MacLean, III et al. | |
| 7,809,377 B1 | 10/2010 | Lau et al. | |
| 7,809,456 B2 | 10/2010 | Katircioglu | |
| 7,895,131 B2 | 2/2011 | Kraft | |
| 8,061,607 B1 | 11/2011 | Crossno et al. | |
| 8,239,169 B2 | 8/2012 | Gregory et al. | |
| 8,299,920 B2 | 10/2012 | Hamm et al. | |
| 8,392,339 B2 | 3/2013 | Kraft | |
| D681,649 S | 5/2013 | Fletcher et al. | |
| D681,650 S | 5/2013 | Fletcher et al. | |
| D681,651 S | 5/2013 | Fletcher et al. | |
| D681,662 S | 5/2013 | Fletcher et al. | |
| D681,670 S | 5/2013 | Fletcher et al. | |
| 8,502,672 B1 | 8/2013 | Crossno | |
| 8,515,804 B2 | 8/2013 | Brennan | |
| 8,560,274 B2 | 10/2013 | Gregory et al. | |
| 8,725,165 B2 | 5/2014 | Lau et al. | |
| 8,766,797 B2 | 7/2014 | Hamm et al. | |
| 8,786,437 B2* | 7/2014 | Breed | G06K 9/00771 |
| | | | 340/568.1 |
| 8,838,095 B2 | 9/2014 | Jouin | |
| 8,886,216 B1* | 11/2014 | Crossno | G06Q 10/0833 |
| | | | 455/456.1 |
| 9,002,679 B2* | 4/2015 | Gregory | G06Q 10/0833 |
| | | | 702/187 |
| 9,020,536 B1 | 4/2015 | Crossno et al. | |
| 9,083,063 B2* | 7/2015 | Specht | H01M 50/103 |
| 9,095,001 B2 | 7/2015 | Lemmon et al. | |
| 9,136,595 B2* | 9/2015 | Wang | H01Q 1/38 |
| 9,194,932 B2 | 11/2015 | Lee et al. | |
| 9,748,668 B2* | 8/2017 | Wang | H01Q 21/0087 |
| 9,966,587 B2* | 5/2018 | Besen | G06F 1/1635 |
| 10,146,214 B2 | 12/2018 | Linton et al. | |
| 2002/0049622 A1 | 4/2002 | Lettich et al. | |
| 2002/0091536 A1 | 7/2002 | Seaman et al. | |
| 2002/0099578 A1 | 7/2002 | Eicher, Jr. et al. | |
| 2002/0099598 A1 | 7/2002 | Eicher, Jr. et al. | |
| 2002/0138316 A1 | 9/2002 | Katz et al. | |
| 2002/0138317 A1 | 9/2002 | Mok et al. | |
| 2002/0138324 A1 | 9/2002 | Zarefoss et al. | |
| 2002/0161674 A1 | 10/2002 | Scheer | |
| 2002/0174000 A1 | 11/2002 | Katz et al. | |
| 2002/0178077 A1 | 11/2002 | Katz et al. | |
| 2002/0188496 A1 | 12/2002 | Feldman et al. | |
| 2003/0014287 A1 | 1/2003 | Williams et al. | |
| 2003/0018490 A1 | 1/2003 | Magers et al. | |
| 2003/0033179 A1 | 2/2003 | Katz et al. | |
| 2003/0061081 A1 | 3/2003 | Kellond et al. | |
| 2003/0083947 A1 | 5/2003 | Hoffman et al. | |
| 2003/0172008 A1 | 9/2003 | Hage et al. | |
| 2003/0225651 A1 | 12/2003 | Chen | |
| 2004/0044688 A1 | 3/2004 | Brudz et al. | |
| 2004/0117358 A1 | 6/2004 | von Kaenel et al. | |
| 2004/0148217 A1 | 7/2004 | Lauring et al. | |
| 2004/0215551 A1 | 10/2004 | Eder | |
| 2004/0260703 A1 | 12/2004 | Elkins et al. | |
| 2005/0015265 A1 | 1/2005 | Price | |
| 2005/0071207 A1 | 3/2005 | Clark et al. | |
| 2005/0102500 A1 | 5/2005 | Khangaonkar et al. | |
| 2005/0149377 A1 | 7/2005 | Schierholt | |
| 2006/0055163 A1 | 3/2006 | Cho | |
| 2006/0085323 A1 | 4/2006 | Matty et al. | |
| 2006/0100912 A1 | 5/2006 | Kumar et al. | |
| 2007/0203770 A1 | 8/2007 | Grosvenor et al. | |
| 2007/0287438 A1 | 12/2007 | Hansen et al. | |
| 2008/0055163 A1* | 3/2008 | Man | H01Q 21/28 |
| | | | 343/702 |
| 2008/0062044 A1 | 3/2008 | Al-Mahdawi | |
| 2008/0172262 A1 | 7/2008 | An et al. | |
| 2008/0300946 A1 | 12/2008 | Clark et al. | |
| 2010/0125486 A1 | 5/2010 | Sinclair et al. | |
| 2010/0194560 A1 | 8/2010 | Hojecki et al. | |
| 2010/0198631 A1 | 8/2010 | Edwards et al. | |
| 2011/0251865 A1 | 10/2011 | Yuen et al. | |
| 2011/0302171 A1 | 12/2011 | Waldo et al. | |
| 2011/0307292 A1 | 12/2011 | Waldo et al. | |
| 2012/0197686 A1 | 8/2012 | Abu El Ata | |
| 2012/0254345 A1 | 10/2012 | Montoya | |
| 2012/0306646 A1 | 12/2012 | Walker et al. | |
| 2013/0080200 A1 | 3/2013 | Connolly et al. | |
| 2013/0090961 A1 | 4/2013 | Smith | |
| 2014/0018950 A1 | 1/2014 | Linton et al. | |
| 2014/0019189 A1 | 1/2014 | Linton | |
| 2014/0019471 A1 | 1/2014 | Linton et al. | |
| 2014/0048951 A1 | 1/2014 | Linton et al. | |
| 2014/0065948 A1 | 3/2014 | Huang | |
| 2014/0132478 A1* | 5/2014 | Wang | H01Q 21/24 |
| | | | 343/893 |
| 2014/0278728 A1 | 9/2014 | Hollenbach et al. | |
| 2015/0046363 A1 | 2/2015 | McNamara et al. | |
| 2015/0177810 A1 | 6/2015 | Gregory et al. | |
| 2016/0054448 A1 | 2/2016 | Woolf et al. | |
| 2017/0054129 A1* | 2/2017 | Besen | G06F 1/1635 |
| 2017/0344939 A1 | 11/2017 | Linton et al. | |
| 2018/0365636 A1* | 12/2018 | Lucrecio | G06Q 50/30 |
| 2018/0365771 A1* | 12/2018 | Kilburn | G07C 5/0808 |
| 2019/0113632 A1* | 4/2019 | Lucrecio | G01S 5/0294 |
| 2020/0059707 A1* | 2/2020 | Lucrecio | G06Q 50/28 |

FOREIGN PATENT DOCUMENTS

| | | |
|---|---|---|
| CN | 201311674 | 9/2009 |
| EP | 2216917 | 8/2010 |
| WO | WO 2001/75700 | 10/2001 |
| WO | WO 2006/083752 | 8/2006 |
| WO | WO 2011/025987 | 3/2011 |

OTHER PUBLICATIONS

"Cold Chain Shipping: Protecting Temperature Sensitive Products," GPS International Technologies, Inc., 2014, retrieved from https://web.archive.org/web/20140422224603/http://www.gpsit.com/asset-tracking/industry-solutions/cold-chain-shipping.html, 3 pages.

"Digital Transformation of Industries: In collaboration with Accenture," World Economic Forum White Paper, 2016, p. 31 pages.

"FedEx Expands SenseAwares Availability to International Markets; Adds New Capabilities to Provide Customers with Greater Flexibility and Reach," FedEx, Nov. 5, 2012, retrieved from https://about.van.fedex.com/newsroom/senseaware-expands-availability-to-international-markets/, 3 pages.

"ILC2000 Cargo Monitoring and Tracking Device," Moog Crossbow, 2016, retrieved from https://web.archive.org/web/20160119002920/http://www.moog-crossbow.com/asset-tracking/products-services/ilc3000/, 3 pages.

"ILC2000 Cargo Monitoring and Tracking Device," Moog Crossbow, 2016, retrieved from https://web.archive.org/web/20160119082804/http://www.moog-crossbow.com/asset-tracking/products-services/ilc2000/, 3 pages.

"Moog Crossbow Asset-Tracking," Moog Crossbow, 2016, retrieved from https://web.archive.org/web/20160119071955/http://www.moog-crossbow.com:80/asset-tracking/, 2 pages.

"Moog Crossbow GeoView," Moog Crossbow, 2016, retrieved from https://web.archive.org/web/20160119082934/http://www.moog-crossbow.com:80/asset-tracking/products-services/geoview/, 2 pages.

"Moog Crossbow Markets," Moog Crossbow, 2016, retrieved from https://web.archive.org/web/20160118193917/http://www.moog-crossbow.com/asset-tracking/markets/, 3 pages.

"PT300 Package Tracker," GPS International Technologies, Inc., 2014, retrieved from https://web.archive.org/web/20141224223438/http://www.gpsit.com/gps-tracking-system/gps-trackers/pt300-package-tracker.html, 4 pages.

(56) References Cited

OTHER PUBLICATIONS

"PT300 Tracking System," Sendum Wireless Corporation, 2014, retrieved from http://sendum.com/pt300-package-tracker/, 11 pages.
"SenseAware PT300D," FedEx, 2016, 1 page.
"SenseAware, What Is Sensor-Based Logistics," FedEx, 2015, retrieved from https://web.archive.org/web/20151007214612/http://www.senseaware.com/what-is-sensor-based-logistics/, 1 page.
"SenseAware," FedEx, 2014, 2 pages.
"SENTRY 500," OnAsset Intelligence, 2016, retrieved from https://web.archive.org/web/20160116142643/http://www.onasset.com/sentry.html, 2 pages.
"Supply Risk Solutions Awarded Patent for Multi-Tier Supply Risk Management," PRWeb, Sep. 5, 2013, 3 pages.
"The Kizy online tracking platform," Kizy Global Tracking, 2016, 2 pages.
"Trackinapacktm GPS Tracking Devices," Global Tracking Technologies Ltd., 2016, retrieved from https://web.archive.org/web/20160117002814/http://www.trackinapack.co.uk/gpstrackingdevices, 6 pages.
"What Kizy can do for you," Kizy Global Tracking, 2016, retrieved from http://www.kizytracking.com/en/customers, retrieved on Apr. 13, 2016, 4 pages.
Steiner, "FedEx innovation exec shares slides, story behind SenseAware service," Innovation Leader, https://www.innovationleader.com/fedex-innovation-exec-shares-slides-story-behind-senseaware-service/, 5 pages.
International Search Report and Written Opinion for International (PCT) Patent Application No. PCT/IB2017/000737, dated Sep. 13, 2017 11 pages.
International Preliminary Report on Patentability for International (PCT) Patent Application No. PCT/IB2017/000737, dated Dec. 6, 2018 9 pages.
Official Action for U.S. Appl. No. 13/935,209, dated Mar. 17, 2015 17 pages.
Official Action for U.S. Appl. No. 13/935,114, dated Dec. 3, 2015, 53 pages.
Final Action for U.S. Appl. No. 13/935,114, dated Jul. 15, 2016, 70 pages.
Official Action for U.S. Appl. No. 13/935,114, dated Jan. 26, 2017, 63 pages.
Final Action for U.S. Appl. No. 13/935,114, dated Aug. 10, 2017, 68 pages.
Official Action for U.S. Appl. No. 13/935,114, dated Dec. 15, 2017, 69 pages.
Notice of Allowance for U.S. Appl. No. 13/935,114, dated Jul. 19, 2018, 16 pages.
Official Action for U.S. Appl. No. 13/935,198, dated Sep. 26, 2016, 34 pages.
Final Action for U.S. Appl. No. 13/935,198, dated Mar. 8, 2017, 24 pages.
Official Action for U.S. Appl. No. 13/935,198, dated Jun. 27, 2017, 28 pages.
Final Action for U.S. Appl. No. 13/935,198, dated Nov. 1, 2017, 30 pages.
Official Action for U.S. Appl. No. 13/935,198, dated Feb. 21, 2018, 31 pages.
Final Action for U.S. Appl. No. 13/935,198, dated Jul. 20, 2018, 31 pages.
Official Action for U.S. Appl. No. 13/935,198, dated Dec. 28, 2018, 38 pages.
Final Action for U.S. Appl. No. 13/935,198, dated Jun. 26, 2019, 41 pages.
Official Action for U.S. Appl. No. 13/935,224, dated Jul. 2, 2015, 15 pages.
Final Action for U.S. Appl. No. 13/935,224, dated Feb. 9, 2016, 29 pages.
Official Action for U.S. Appl. No. 13/935,224, dated Jan. 13, 2017, 32 pages.
Final Action for U.S. Appl. No. 13/935,224, dated Jul. 18, 2017, 39 pages.
Official Action for U.S. Appl. No. 13/935,224, dated Jul. 17, 2018, 38 pages.
Final Action for U.S. Appl. No. 13/935,224, dated Feb. 25, 2019, 38 pages.
Official Action for U.S. Appl. No. 13/935,224, dated Jan. 10, 2020, 40 pages.
Official Action for U.S. Appl. No. 14/453,788 dated Nov. 16, 2018, 27 pages.
Final Action for U.S. Appl. No. 14/453,788 dated May 31, 2019, 11 pages.
Official Action for U.S. Appl. No. 15/604,485, filed Jul. 29, 2019, 18 pages.
Official Action for U.S. Appl. No. 16/559,125 dated Apr. 30, 2021, 12 pages.
Final Action for U.S. Appl. No. 16/559,125 dated Aug. 23, 2021, 13 pages.

\* cited by examiner

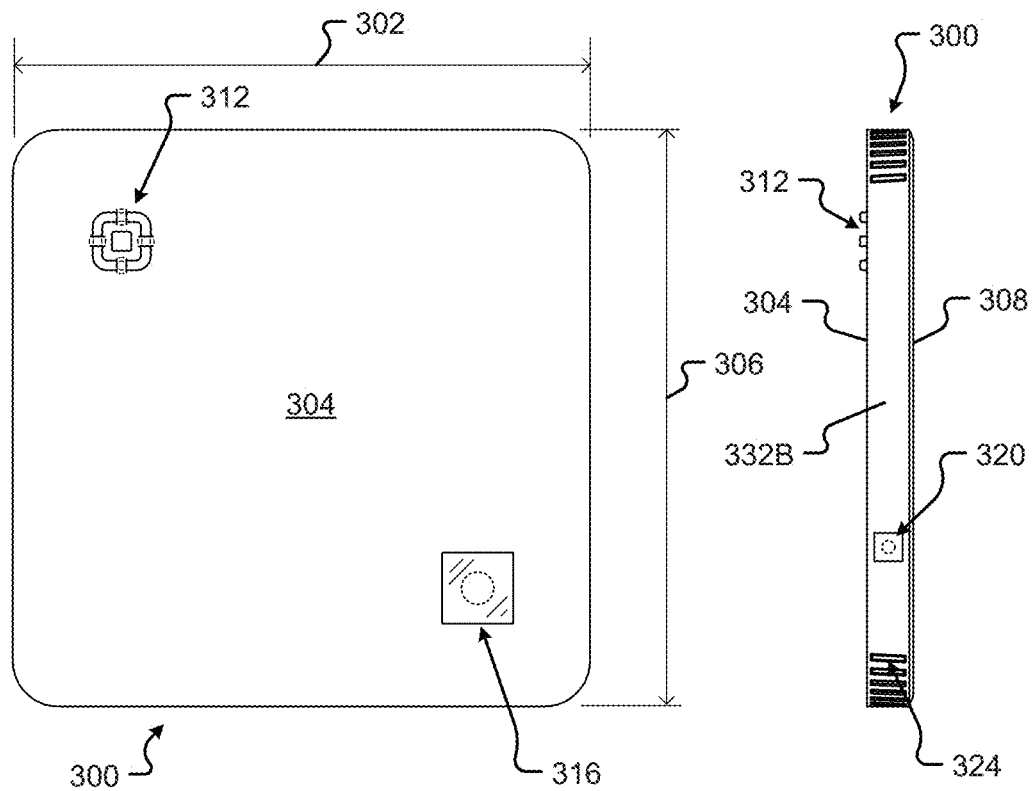
*Fig. 3B*
*Fig. 3D*
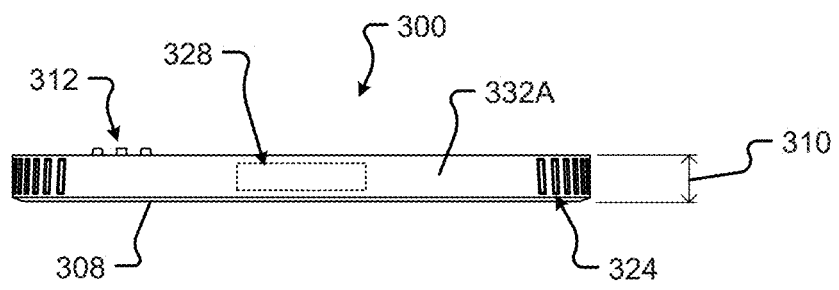
*Fig. 3C*

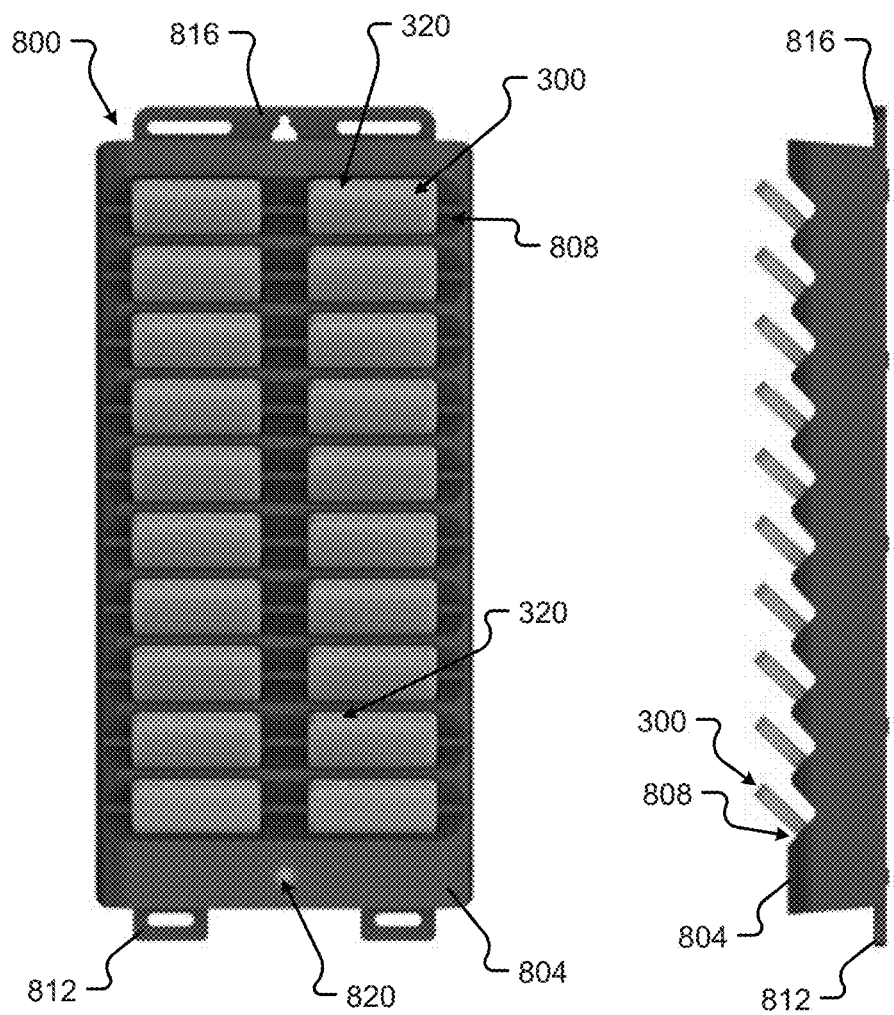
*Fig. 8A*
*Fig. 8C*
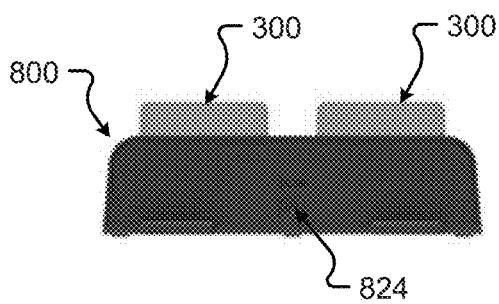
*Fig. 8B*

SYSTEMS AND METHODS FOR ACTIVE SUPPLY CHAIN MONITORING

CROSS REFERENCE TO RELATED APPLICATIONS

The present application is a continuation of U.S. patent application Ser. No. 15/604,485, filed May 24, 2017, entitled "Systems And Methods For Active Supply Chain Monitoring;" which claims the benefits of and priority, under 35 U.S.C. § 119(e), to U.S. Provisional Application Ser. No. 62/482,005, filed Apr. 5, 2017, entitled "Systems and Methods for Active Supply Chain Monitoring"; U.S. Provisional Application Ser. No. 62/477,272, filed Mar. 27, 2017, entitled "Systems and Methods for Active Supply Chain Monitoring"; and to U.S. Provisional Application Ser. No. 62/340,599, filed May 24, 2016, entitled "Technology Systems and Methods for Active Supply Chain Monitoring and Optimization." The entire disclosures of the applications listed above are hereby incorporated herein by reference, in their entirety, for all that they teach and for all purposes.

FIELD

The present disclosure is generally directed to the logistics tracking and, in particular, toward the use of logistics tracking units in monitoring shipments.

BACKGROUND

Traditional shipping models generally included a limited number of simple transportation modes and methods to deliver a product to its final destination. However, the traditional shipping models typically dealt with large cargo transported by dedicated carriers. As can be appreciated, tracking a conventional shipment under this model was a fairly simple process of reviewing a shipping list, or inspecting the shipment, after it had reached a particular handoff point or destination.

Recently, the traditional shipping model has been significantly altered to include a number of handoffs and/or transfers between various carriers to meet optimized delivery logistics. In addition, as lean manufacturing methods are increasingly employed in the technology sector, the shipping demands associated with product and/or component inventory has significantly changed. In short, these changes require an enhanced tracking of shipments beyond the traditional model of checking a shipment upon reaching a destination.

BRIEF DESCRIPTION OF THE DRAWINGS

FIG. 3B shows a first plan view of the logistics tracking unit of FIG. 3A;

FIG. 3C shows a front elevation view of the logistics tracking unit of FIG. 3A;

FIG. 3D shows a right elevation view of the logistics tracking unit of FIG. 3A;

FIG. 8A shows a front plan view of a logistics tracking unit charging system in accordance with embodiments of the present disclosure;

FIG. 8B shows a bottom end view of the logistics tracking unit charging system of FIG. 8A;

FIG. 8C shows a right end view of the logistics tracking unit charging system of FIG. 8A;

DETAILED DESCRIPTION

It is with respect to the above issues and other problems that the embodiments presented herein were contemplated.

In general, embodiments of the present disclosure provide methods, devices, and systems by which assets, objects, and/or shipments may be tracked at any point during a shipment. At least one aspect of the present disclosure includes providing rich tracking information including environmental conditions, timing, travel information, and/or other data associated with a monitored shipment. The information may be gathered by one or more tracking units, compiled by a tracking server, and presented to a user to provide graphical and intuitive logistics tracking information in real-time, near-real-time, and/or as a shipment is in transit.

Embodiments of the present disclosure will be described in connection with a logistics tracking unit (LTU). The LTU may be configured as a physical device that can be selectively associated with a package, shipment, cargo, and/or other object that travels from an origin to a destination. In some embodiments, the LTU may be secured to an object directly and/or in a tamperproof travel pouch. In any event, the LTU may be associated with a traveling object physically (e.g., attached thereto, etc.) and/or virtually (e.g., associating an identification of a shipment to an identification of the LTU, etc., which can be stored in the cloud or some other memory.

Figure 1:
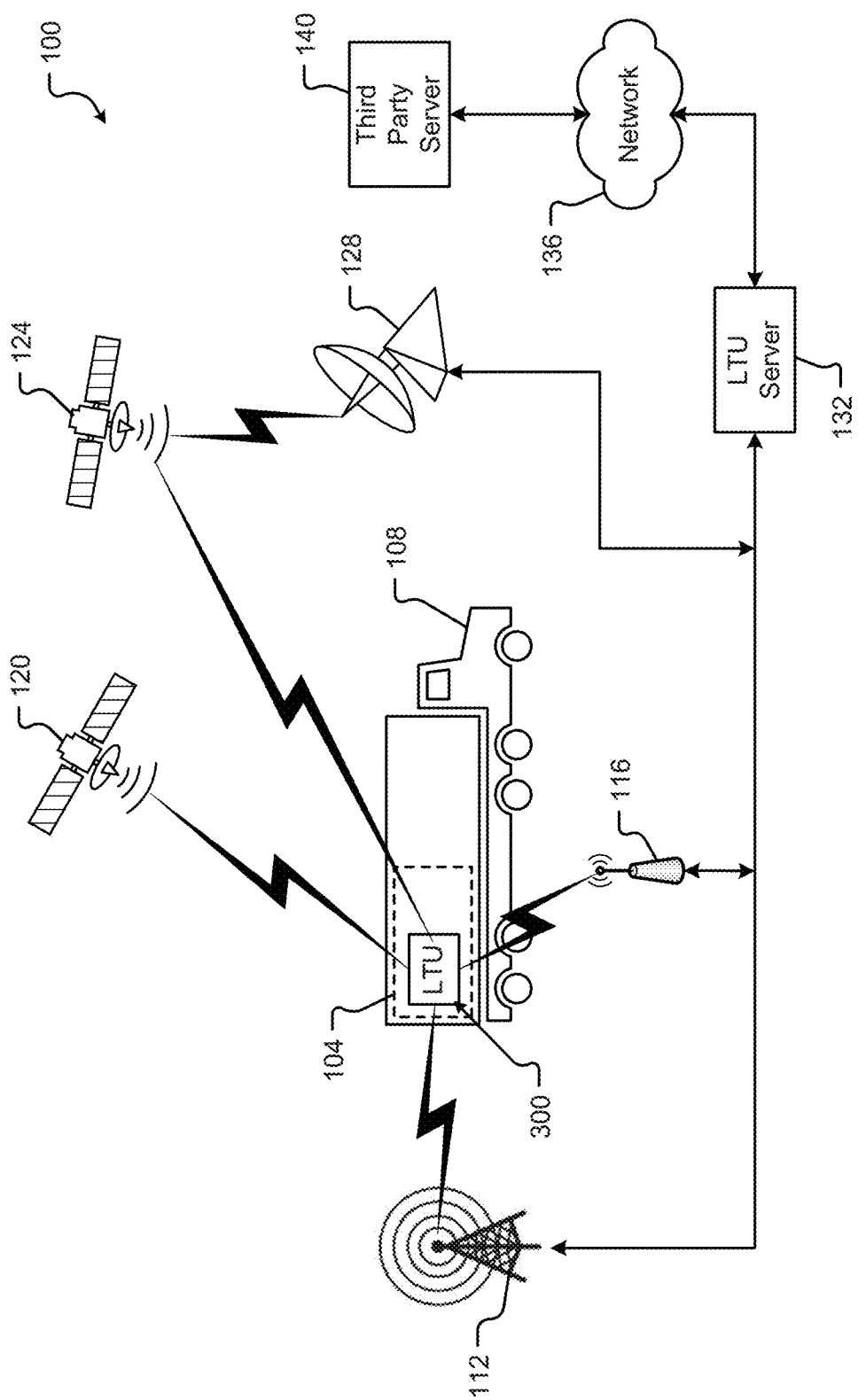
FIG. 1 is a block diagram of a logistics tracking system in accordance with embodiments of the present disclosure.

Tracking Environment:

FIG. 1 is a block diagram of a logistics tracking system 100 in accordance with embodiments of the present disclosure. The logistics tracking system 100 may include a shipping object 104 and an associated logistics tracking unit (LTU) 300. The shipping object 104 and LTU 300 may be transported via at least one vehicle 108 (e.g., truck, car, ship, airplane, drone, etc.). Examples of shipping objects 104 may include, but are in no way limited to, a package, pallet, box, travel container, shipping container, bulk container, freight container, drum, crate, pail, etc., and/or combinations thereof. In some cases, the shipping object 104 may represent a group of individual shipping containers that are grouped together to form a single trackable shipment. The LTU 300 may be selectively attached to a shipping object 104 and associated with a corresponding shipment. The association of the LTU 300 to the shipment may be performed via one or more instructions sent from an LTU server 132 to the LTU 300. Association of the LTU 300 may include correlating a unique identification of an LTU 300 with a unique shipment identification (e.g., including one or more shipping objects 104, etc.). Once recorded, the correlation may be recorded in a memory of the LTU server 132 and/or third-party server 140. In some embodiments, the association between the LTU 300 and the shipment may last until the association for the LTU 300 is reset (e.g., once a shipment is completed, upon receiving reset commands from the LTU server 132, etc.).

Once the LTU 300 is associated with a shipment and is in an active state (e.g., turned on, programmed to report, etc.), the LTU 300 may record and/or report a position, location, environmental conditions, force measurements, changes in information, combinations thereof, and/or any other information related to the shipment. The LTU 300 may report this information via a number of different communications channels and/or devices. In some embodiments, the LTU 300 may be configured to determine a geographical position using one or more satellite positioning systems. Examples of satellite positioning systems may include, but is in no way limited to, the global positioning system (GPS), global navigation satellite system (GLONASS), BeiDou navigation satellite system (BeiDou-2), European Union global navigation satellite system (GNSS), etc., and/or combinations thereof. While the geographical position of the LTU 300 may be determined via information received from any propriety or open satellite positioning system, the term GPS may be used herein to represent all satellite positioning systems. The LTU 300 may include a GPS receiver configured to exchange position information with a GPS satellite system 120. This position information may be stored in a memory of the LTU 300.

As the LTU may be configured with a suite of sensors, the LTU 300 may detect and report a number of conditions and/or other tracking information associated with a shipment. For instance, the LTU 300 may detect, record, and report tracking information including, but in no way limited to, geographical position, temperature, humidity, barometric pressure, atmospheric conditions (e.g., oxygen, carbon monoxide, carbon dioxide, and/or other gas and levels detected), shock, impacts, lighting, and/or other conditions associated with a shipment. In any event, the LTU 300 may be configured to transmit and/or receive information via one or more orbiting communication satellites 124 and terrestrial satellite dish 128, terrestrial antennas 112 (e.g., cell towers, repeaters, GSM communication equipment, etc.), wireless local area networking (WiFi) hotspots 116, and/or other radio frequency communications. Reported information may be passed along various communication channels to an LTU server 132. In some embodiments, the LTU server 132 may be configured to send instructions, commands, and/or other information to the LTU 300 via the same or similar communication channels.

As described herein, the LTU 300 may send and/or receive data across one or more of the communications channels via one or more methods, protocols, and/or devices. In some cases, the LTU 300 may be configured to send information via the fastest route (e.g., the communication channel and/or mode having the fastest available data transfer rate, etc.). In one embodiment, the LTU 300 may be configured to send information via the most reliable route (e.g., via a communication channel including error checking and/or complete transmission checking, TCP, etc.). In any event, the LTU 300 may determine that one or more of the communications channels are unavailable (e.g., low signal strength, unreliable connection, etc.) and switch communication to another available channel. The LTU 300 may switch between transmission types and/or modes "on-the-fly," or as a communications channels become unavailable or available. In the event that no communication channel is available, the LTU 300 may store information in a memory to be sent or transmitted at a later time (e.g., the next time a communication channel becomes available, etc.).

The LTU server 132 may be configured to interpret the information received from one or more LTUs 300 in transit and compile the information for presentation to at least one third-party server 140. The third-party server 140 may correspond to the server associated with a shipper, a carrier, a receiver, an insuring entity, a governmental regulatory entity, and/or some other entity/party. The compiled information may provide details to the third-party regarding a particular shipment, the position and/or location of each LTU 300, estimated time of travel and/or arrival, state and/or conditions of the shipment and/or other data.

In some embodiments, communications between the third-party server 140 and the LTU server 132 may be exchanged across at least one communication network 136. In accordance with at least some embodiments of the present disclosure, the communication network 136 may comprise any type of known communication medium or collection of communication media and may use any type of protocols to transport messages between endpoints. The communication network 136 may include wired and/or wireless communication technologies. The Internet is an example of the communication network 136 that constitutes an Internet Protocol (IP) network consisting of many computers, computing networks, and other communication devices located all over the world, which are connected through many telephone systems and other means. Other examples of the communication network 136 include, without limitation, a standard Plain Old Telephone System (POTS), an Integrated Services Digital Network (ISDN), the Public Switched Telephone Network (PSTN), a Local Area Network (LAN), a Wide Area Network (WAN), a Voice over Internet Protocol (VoIP) network, a Session Initiation Protocol (SIP) network, a cellular network, and any other type of packet-switched or circuit-switched network known in the art. In addition, it can be appreciated that the communication network 136 need not be limited to any one network type, and instead may be comprised of a number of different networks and/or network types. The communication network 136 may comprise a number of different communication media such as coaxial cable, copper cable/wire, fiber-optic cable, antennas for transmitting/receiving wireless messages, and combinations thereof.

Figure 2:
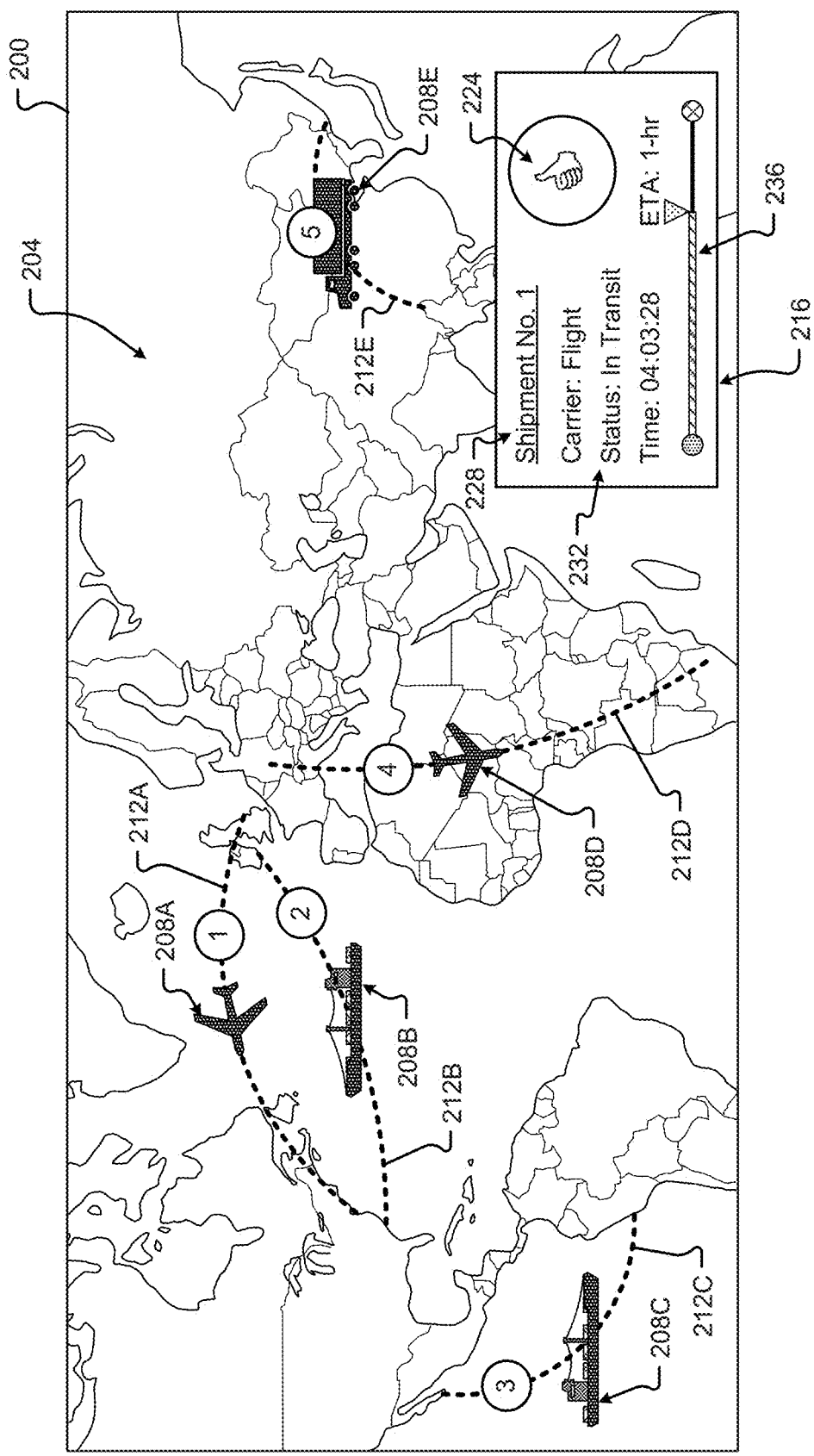
FIG. 2 is a representation of a graphical user interface displaying logistics tracking information in accordance with embodiments of the present disclosure.

Logistics Tracking Interface:

FIG. 2 is a representation of a graphical user interface (GUI) 200 displaying logistics tracking information in accordance with embodiments of the present disclosure. In some embodiments, the logistics tracking information may be presented to a display device, screen, and/or touchscreen associated with a computing device (e.g., server, computer, smart phone, tablet, etc.). The GUI 200 may include a graphical representation of a map 204 including a number of geographical locations including shipping origins, waypoints, and destinations.

The GUI 200 may include tracking information provided by at least one LTU 300 associated with a shipment. In some embodiments, one or more shipments in transit 208A-208E may be represented by a high-level graphical image. The high-level graphical image may correspond to an image configured to show one or more aspects of the shipment including, but in no way limited to, a travel path 212A-212E, a mode of transportation (e.g., represented as a symbol corresponding to a particular transport or shipping vehicle, etc.) an origin (e.g., a first endpoint of the travel path 212A-212E, etc.), a destination (e.g., a second or final endpoint of the travel path 212A-212E, etc.), a direction of travel (e.g., indicated by a direction of the transportation mode symbol, arrow, or other indicator, etc.), and/or a point in the travel path (e.g., indicated by a relative position of the transport mode symbol along the path 212A-212E, and/or a position between the endpoints, etc.).

In some embodiments, a user may be able to determine more information by selecting a particular shipment in transit 208A-208E, travel path 212A-212E, origin, destination, and/or endpoint, to name a few. For example, a user may interface with the GUI 200 and select a graphical element associated with the first shipment 208A, 212A, etc. Upon selecting the graphical element (e.g., the airplane transportation mode symbol, etc.), the GUI 200 may present a first-level detail window 216 to a portion of the GUI 200. The information in the first-level detail window 216 may provide enhanced details provided from the LTU 300 associated with the first shipment in transit 208A. The enhanced details may include more specific and/or additional information than is available from the high-level graphical image for each tracked shipment. By way of example, the window 216 may include a shipment identifier 228, shipping specifics 232 (e.g., carrier type, carrier identification, status, time in transit, total time shipping, etc.), graphical estimated time of arrival 236, and/or an LTU condition indicator 224. In some embodiments, one or more of these details may be selected to reveal further details about a selected details. This additional level of detail may be referred to as a second-level detail view. In one embodiment, the second-level detail view may open a new window, popup, or other viewer.

Continuing the example above, the first-level detail window 216 shows that the first shipment 208A is shipping by air, has been "in-transit" for just over four hours, and there is one hour left before the shipment is scheduled to arrive at a destination. In addition, the first-level detail window 216 shows that the state of the LTU 300 (e.g., via the LTU condition indicator 224) associated with that shipment is satisfactory (e.g., via a thumbs up, check mark, etc.). A satisfactory state of the LTU 300 may serve to indicate that the LTU 300 has not been subjected to extreme temperatures, forces, shocks, delays, interruptions, and/or other measured values that exceed a predetermined threshold. The predetermined threshold may be set for a particular shipment or LTU 300 by a carrier, shipper, and/or receiver. In some cases, the threshold may be matched to a particular type of cargo (e.g., food, live animals, sensitive equipment, etc.), such that any deviation outside of acceptable predetermined limits (e.g., temperatures, pressures, time delays, etc.) raises an alarm. As can be appreciated, the LTU 300 may send an alarm reporting this deviation to the LTU server 132 and/or third-party server 140 in real-time, as the deviation is detected, in near-real-time, and/or in non-real-time when the LTU 300 can establish a communication channel to the LTU server 132 and/or third-party server 140.

In one embodiment, selecting the LTU condition indicator 224 may allow a user to request additional information about the status of the LTU 300 over a recorded time period of the shipment. As described above, the requested additional information may be presented via a second-level detail view that may be configured to open a new window, popup, or other viewer. In one embodiment, any recorded information, or event, may be shown on a timeline representing the travel of the LTU 300 during the shipment. The timeline may include an overlay of waypoints, changes of transportation modes, tracking events, and/or other shipping events detected by the LTU 300. The information presented to the GUI 200 may be compiled and/or arranged by the LTU server 132 described herein.

The mechanical details of the LTU 300 are described in conjunction with FIGS. 3A-3G. The LTU 300 may incorporate a split-housing design including a cover 304 and a base 308. The cover 304 and the base 308 may be interconnected and/or sealed via one or more fastening elements 348, retaining clips 360, gaskets, and/or O-rings. In any event, an LTU electronics subassembly 600 may be arranged within the split-housing of the LTU 300. This arrangement may include weatherproofing, athermalization, shock resistance, sensor data permeability, etc., and/or interference isolation from one or more components of the LTU electronics subassembly 600.

Logistics Tracking Unit:

Referring to FIG. 3, a perspective view of the LTU 300 is shown in accordance with embodiments of the present disclosure. The LTU 300 may include a number of features to allow for easy installation, unobtrusive attachment, reliable tracking or movement monitoring, data reporting, and/or handling. As shown in FIG. 3, the cover 304 of the LTU 300 includes an environmental sensor aperture 312, an ambient lighting sensor window 316, an indicator 320 (e.g., a light emitting diode (LED), display output, touchscreen, etc.), and/or an optional physical port window 328. In some cases, the LTU 300 may include a number of features disposed around the periphery of the device that provide handling gripped areas 324. These areas 324 may be configured as protruding elements, undulated surfaces, interrupted surfaces, indentations in the cover 304, etc., and/or some other irregular portion of the LTU 300 configured to provide a gripping surface for a user of the LTU 300.

The cover 304 may be made from a plastic or other communication signal-permeable material. In one embodiment, the cover 304 may be molded (e.g., injection molded, thermoformed, rotational molded, compression molded, and/or the like) in the form of a three dimensional geometric shape configured to house at least a portion of the electronics subassembly 600 of the LTU 300. In some embodiments, the LTU 300 shape may be configured as a substantially rectangular three-dimensional unit having a minimal height to safely contain the elements of the electronics subassembly 600. In one embodiment, the overall height, or thickness, of the LTU 300 may be dimensioned to have a height less than one inch, or 25.4 millimeters.

In some embodiments, the cover 304 may include an environmental sensor aperture 312 that is configured to allow a portion of the environment outside of the LTU 300 to be exposed to, or pass through, a portion of the inside of the LTU 300. This exposure may be an unobstructed physical path from outside of the LTU 300 to a sensing area of a sensor disposed inside the LTU 300. For instance, the sensor may correspond to a pressure sensor that is configured to measure a barometric pressure in an environment surrounding the LTU 300. In this case, the environmental sensor aperture 312 may provide an opening from the sensor contained within the LTU 300 to the environment surrounding the LTU 300. Parts of the LTU 300 may be sealed and/or isolated from this opening, while the sensor is still allowed to detect and report to the processor of the LTU 300. In some embodiments, the environmental sensor aperture 312 may include a number of features preventing blocking of the physical path from outside of the LTU 300 to a sensing area of a sensor disposed inside the LTU 300. These features may be described in greater detail in conjunction with FIG. 5.

The ambient lighting sensor window 316 may be sealed in a portion of the cover 304. For instance, the ambient lighting sensor window 316 may be inserted and sealed from an interior of the LTU 300. In one embodiment, the ambient lighting sensor window 316 may be inserted and sealed from an exterior of the LTU 300. In yet another embodiment, the ambient lighting sensor window 316 may be configured as a window that is inserted from an interior of the LTU 300 and bonded, sealed, or laminated to a window that is inserted from an exterior of the LTU 300. In any event, the ambient lighting sensor window 316 allows ambient light, or light surrounding a portion of the LTU 300, to pass therethrough and to be detected by a light sensor disposed inside the LTU 300 on the electronics subassembly 600. The ambient lighting sensor window 316 may be transparent and/or translucent such that lighting external to the LTU 300 can be detected by a sensor inside the LTU 300.

The indicator 320 may be an LED or other light emitting element. The indicator 320 may be disposed beneath a window of the cover 304 and/or sealed from an environment inside the LTU 300. The window of the indicator 320 may be similar, if not identical, to the window of the ambient lighting sensor window 316 described above. In some embodiments, the indicator 320 may be configured to provide a visual output representing one or more states of the LTU 300. For example, the indicator 320 may be configured to output a specific color, flash, stay solid, and/or combinations thereof. In one embodiment, the indicator 320 may change color to indicate a state of charge (e.g., green indicating the LTU 300 is fully charged, orange indicating the LTU 300 is less than fully charged, and red indicating the LTU 300 requires charging). Additionally or alternatively, the indicator 320 may provide a visual output representing a state of communication associated with the LTU 300. In this example, the indicator 320 may be colored and/or flash to indicate, among other things, that data is being transferred, there is an interruption in communications, there is a limited communication or data transfer ability, etc.

In some embodiments, the LTU 300 may include one or more ports and/or connectors configured to facilitate an exchange of data between the processor and/or memory of the LTU 300 and an interconnected system (e.g., a computer, server, mobile device, flash drive, etc.). The ports may be a part of, or segregated from, another connection (e.g., a power connection, etc.). In one embodiment, one or more of the ports and/or may be accessible by a removable physical port window 328. The physical port window 328 may be selectively and/or removably sealed to the cover 304 of the LTU 300 via at least one of a fastening element, retaining element, O-ring, gasket, and/or other element, latch, or fastening system. It is an aspect of the present disclosure that the physical port window 328 is weatherproof and capable of preventing fluid, dust, and/or other debris from entering the LTU 300 via an opening in the cover 304.

Figure 3A:
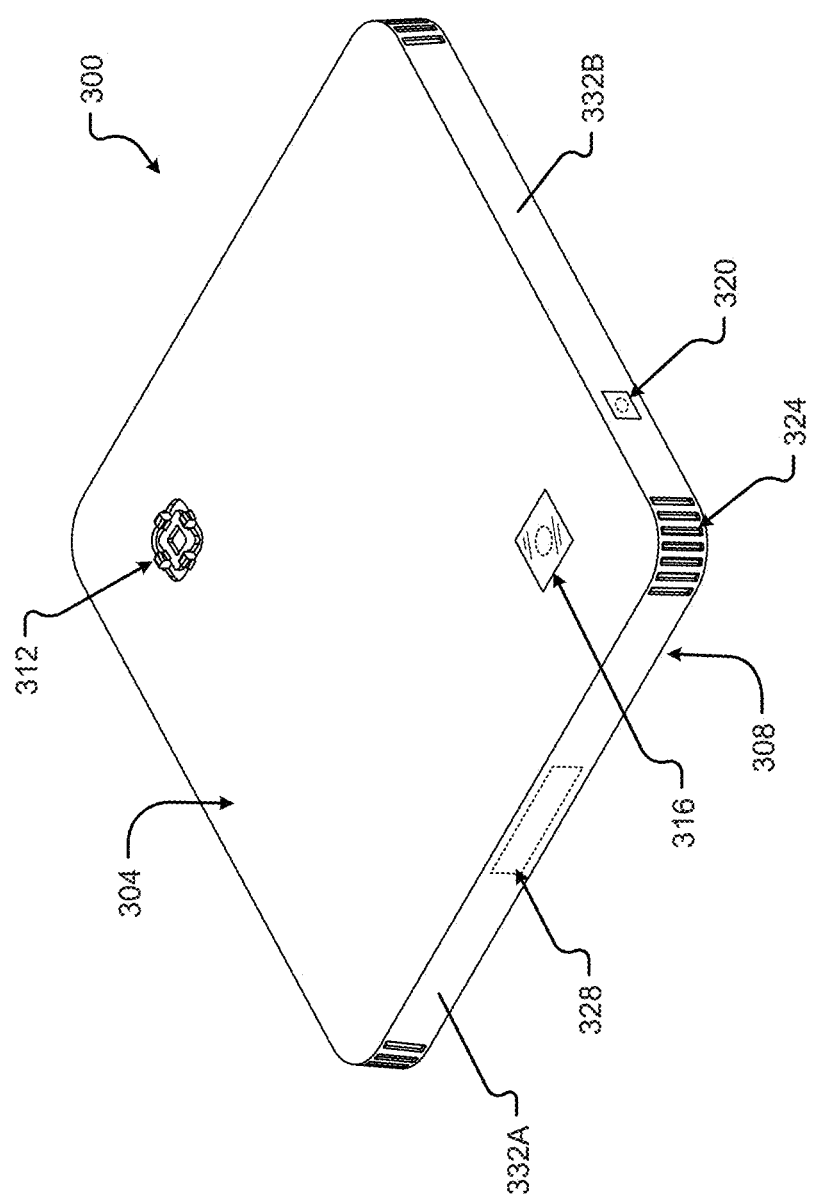
FIG. 3A shows a perspective view of a logistics tracking unit in accordance with embodiments of the present disclosure.
Figure 3E:
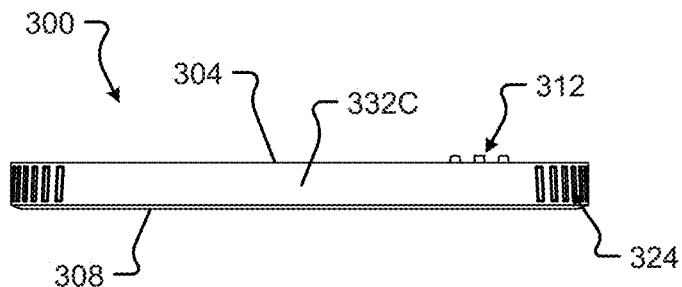
FIG. 3E shows a rear elevation view of the logistics tracking unit of FIG. 3A.

As shown in FIGS. 3B and 3C, the LTU 300 may include a number of dimensions making up the length 302, width 306, and height 310 of the LTU 300. In some embodiments, the length 302 and width 306 may be equal in dimension forming a substantially square area. Although shown as a substantially rectangular three-dimensional shape, the shape of the LTU 300 is not so limited. For instance, the LTU 300 may be cylindrical and/or have any number of sides/surfaces greater than two. In some embodiments, the shape of the LTU 300 may provide accurate and repeatable installation to an object in a monitored shipment. For instance, the substantially rectangular shape of the LTU 300 allows the device to be mounted to a substantially flat surface at the planar surface of the base 308, the cover 304 and/or the sides 332A-D. In some embodiments, one or more of the substantially linear edges (e.g., around the periphery, etc.) of the LTU 300 shown in FIGS. 3A-3G may serve as an alignment or installation datum. Among other things, these linear edges may be aligned to an orientation of the package in shipment. For instance, the width 306 edge may be aligned in an axis vertical (e.g., parallel with the gravity vector) orientation when attached to an object that is part of a shipment. In the event that the object changes orientation (e.g., flips upside down, falls over, etc.) an accelerometer or other sensor of the LTU 300 may determine that the object changed orientation and even report the direction in which the object moved.

Figures 3F, 3G:
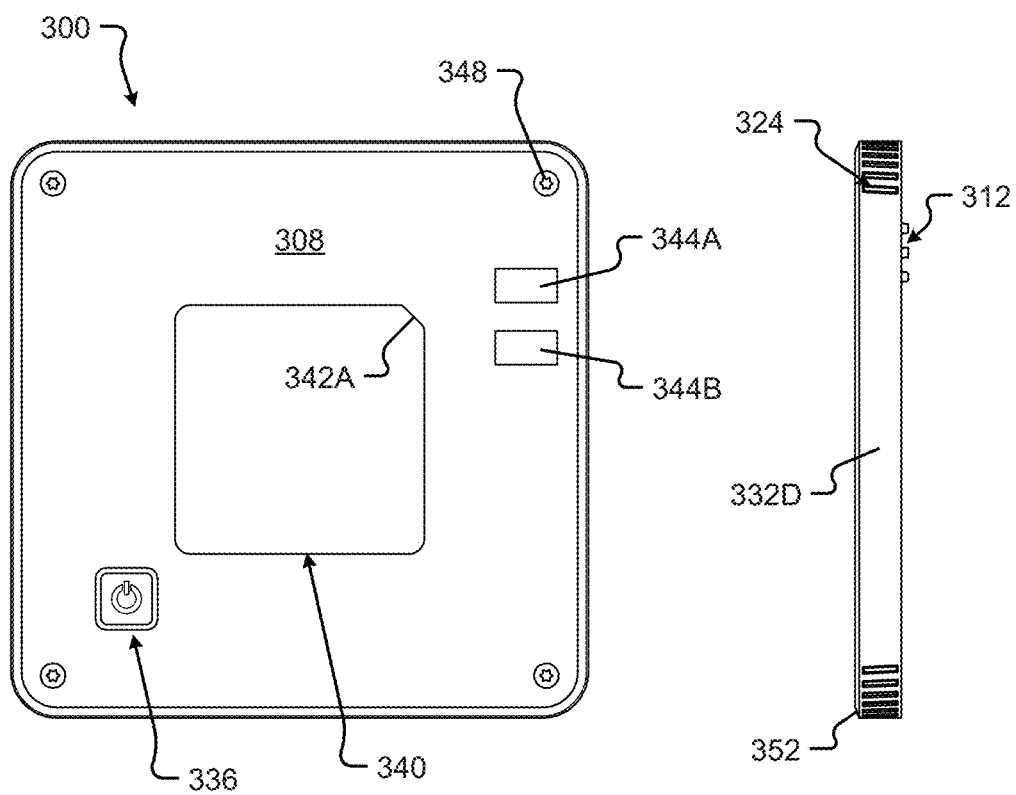
FIG. 3F shows a second plan view of the logistics tracking unit opposite the first plan view shown in FIG. 3B.
FIG. 3G shows a left elevation view of the logistics tracking unit of FIG. 3A.

FIG. 3F shows an embodiment of the underside, or bottom, of the LTU 300. As shown in FIG. 3F, the base 308 of the LTU 300 may include a power button 336, an identification tag area 340, at least one electrical terminal 344A, 344B, and one or more fastening elements 348 (e.g., screws, bolts, etc.), fastening the base 308 to the cover 304 and/or some other portion of the LTU 300).

The power button 336 may be recessed beneath, or under flush with, a planar surface of the base 308. This arrangement may prevent accidental or undesired actuation of the power button 336. In some embodiments, the power button 336 may be limited in functionality. For instance, the power button 336 may only allow a single activation, or powering, of the LTU 300 per shipment. The limited functionality may prevent the device from being turned off from pressing the power button 336 after it has been powered on, until some reset input is provided to the LTU 300. The functionality may be reset, for instance, by recharging the LTU 300, receiving a reset command sent from a control device, upon completion of a shipment, and/or resetting the shipment association via a control processor (e.g., sending a reset command to the LTU 300).

The identification tag area 340 may include an identification tag configured to uniquely identify the LTU 300 from another device and/or other LTU. In some embodiments, the identification tag area 340 may be an RFID tag and/or a printed tag including identifying information contained therein. In some cases, the identification tag area 340 may include a location feature 342 configured to locate an attached identification tag.

The LTU 300 may include electrical contact terminals 344A, 344B configured to provide an electrical contact from an exterior of the LTU 300 to a portion of the electronics subassembly 600 contained therein. The electrical contact terminals 344A, 344B may be configured to charge a battery or other power source 606 of the LTU electronics subassembly 600. Additionally or alternatively, the electrical contact terminals 344A, 344B may be configured to exchange communications between one or more components of the LTU 300 and an interconnected system. In one embodiment, the first terminal 344A may correspond to a positive terminal and the second terminal 344B may correspond to a negative terminal. In any event, the LTU 300 may include any number of terminals that hermetically or weather seal the inside of the LTU 300 from the outside of the LTU 300 and may still allow electrical communication between the inside and outside of the LTU 300. In some embodiments, the terminals 344A, 344B may be insert molded into the base 308 of the LTU 300. The base 308 may include a beveled, arcuate, or chamfered surface 352 running around a periphery of the base 308.

Figure 4:
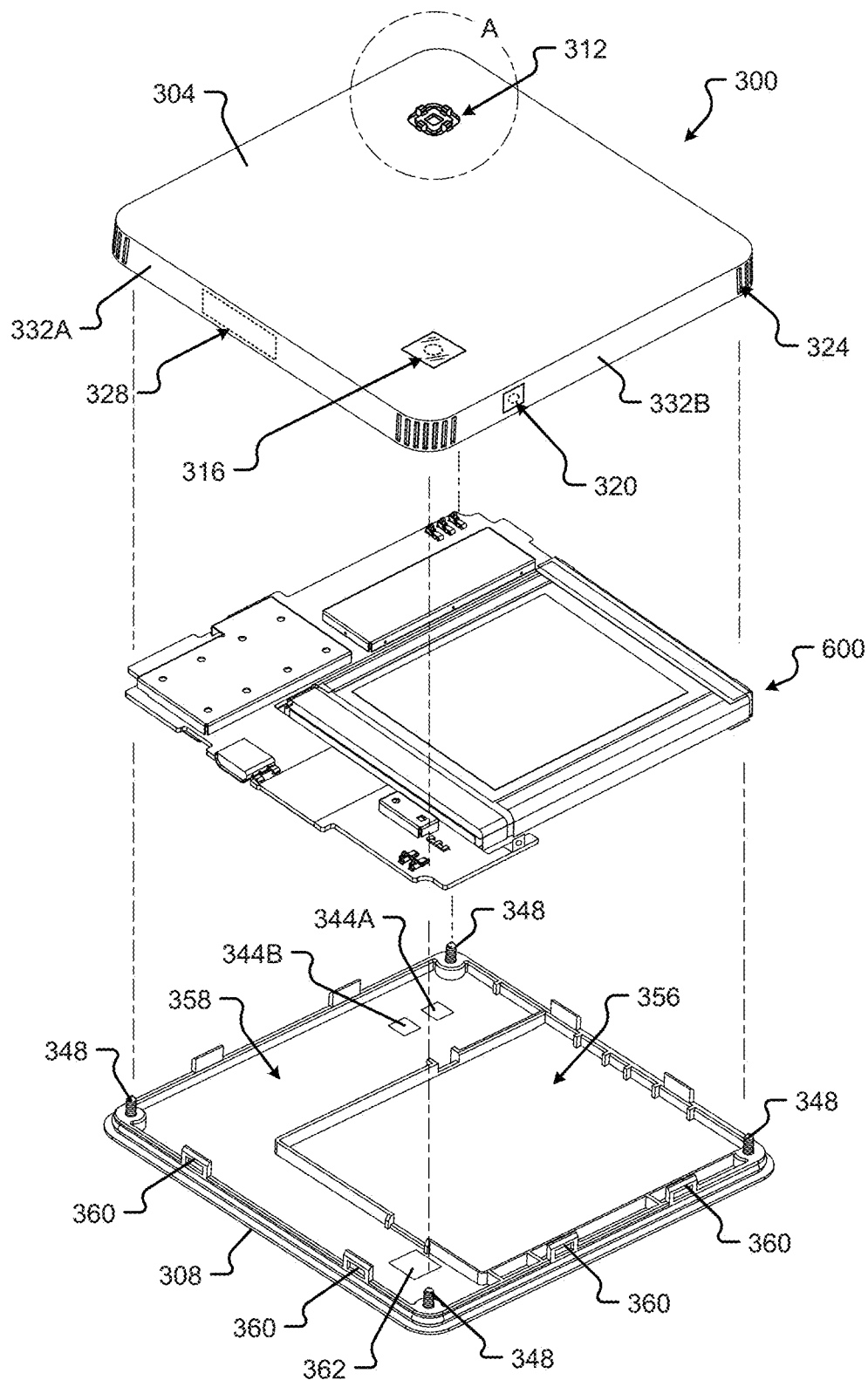
FIG. 4 shows an exploded perspective view of the logistics tracking unit of FIG. 3A

FIG. 4 shows a perspective exploded view of the LTU 300 including the LTU electronics subassembly 600. In some embodiments, the base 308 may include a number of features configured to contain and/or support a portion of the electronics subassembly 600. For instance, the base 308 may include a battery compartment 356 and a printed circuit board (PCB) compartment 658. The battery compartment 356 may include a number of features configured to isolate movement of the battery 606 when retained inside the LTU 300. These isolation features may include one or more of a series of molded contact features in the base 308 and/or the cover 304, a compliant pad (e.g., shock absorbing member, etc.), at least one adhesive contact, retaining clips, and/or some other element or isolation system. The PCB compartment 658 may include an area configured to receive one or more parts of the LTU PCB 604. The PCB compartment 658 may be shaped to substantially match a portion of the LTU PCB 604. In some cases, at least one channel or passthrough may be integrated into the PCB compartment 658 and the battery compartment 656. These features may allow electrical cabling, grounding, and/or other wires to pass from the battery 606 to one or more components of the PCB 604.

The base 308 may include clips 360 configured to mate with corresponding tabs disposed on the cover 304, or vice versa. When mated, the cover 304 and the base 308 may physically connect via the clips 360 and the corresponding features. In some embodiments, the clips 360 may be disposed around a periphery of the LTU 300. The base 308 and/or the cover 304 may include one or more gaskets or O-rings that are configured to provide a seal between the base 308 and cover 304 when interconnected. In one embodiment, the base 308 may include internal switch features 362 configured to receive an actuation input provided at the power button 336 and pass the input to a receiving element on the PCB 604.

Figure 5:
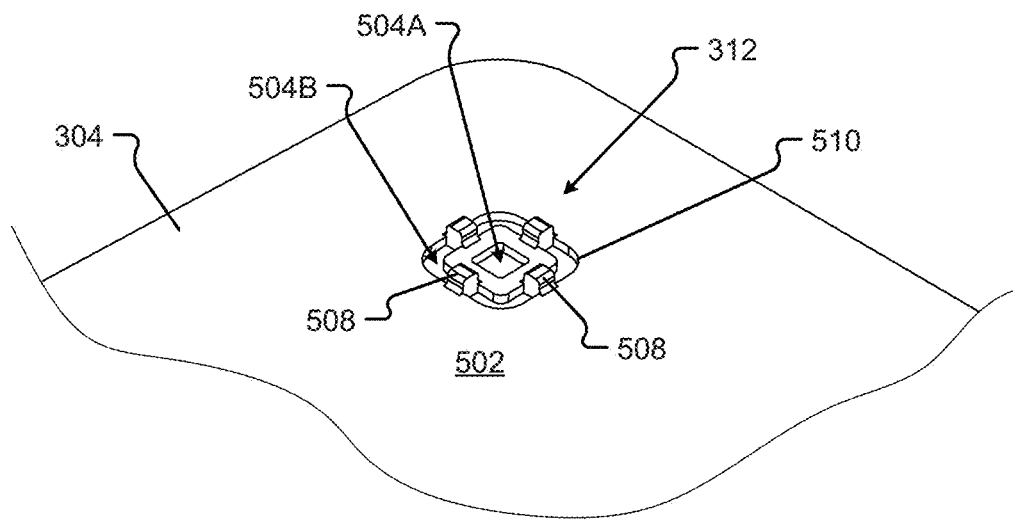
FIG. 5 shows a detail perspective view of a sensor aperture taken from section A of FIG. 4.

FIG. 5 shows a detail view of the environmental sensor aperture 312. As described above, the environmental sensor aperture 312 may be configured to provide an unimpeded sensing path between a portion of the environment outside of the LTU 300 and a sensor disposed inside a portion of the LTU 300. In some embodiments, the environmental sensor aperture 312 may include raised or castellated portions 508 protruding from a planar surface 502 of the cover 304. The castellated portions 508 may be disposed around a periphery 510 of the environmental sensor aperture 312. In any event, the castellated portions 508 provide an interrupted surface of the LTU cover 304 such that a single planar surface cannot block a sensing opening 504A, 504B of the environmental sensor aperture 312. This arrangement is important when the cover 304 of the LTU 300 is placed in intimate contact with a planar surface of some object during shipment. In this example, the LTU 300 may still take accurate measurements of the environment outside of the LTU 300. While shown as a series of castellated portions 508, the raised features are not so limited. For instance, the environmental sensor aperture 312 may employ an undulated or irregular surface, and/or some other feature configured to prevent blocking by an object during operation.

Figure 6A:
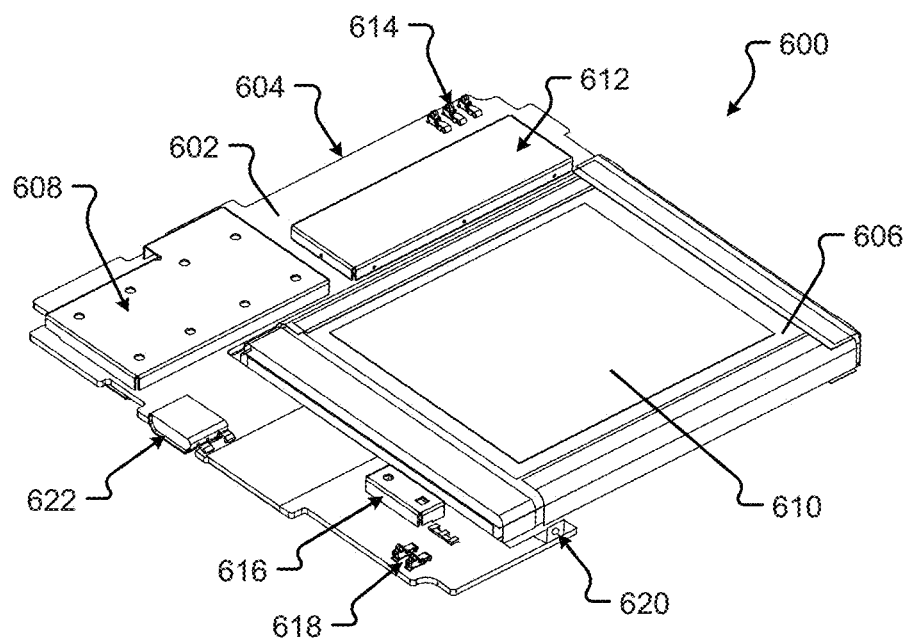
FIG. 6A shows a perspective view of an electronics subassembly of the logistics tracking unit in accordance with at least some embodiments of the present disclosure.

Referring now to FIG. 6A, a perspective view of an LTU electronics subassembly 600 is shown in accordance with embodiments of the present disclosure. The electronics subassembly 600 may include a PCB 604 electrically interconnected with a power source, or battery 606 via one or more connectors. The PCB 604 may include a first antenna 614 (e.g., global system for mobile (GSM) communication antenna, etc.), first electronics and RF shielding 612 (e.g., chips, memory, transistors, etc.), a CPU 608, global positioning system (GPS) system 616 and GPS antenna 618, an indicator element 620, an interface connector 622, and a compliant battery pad 610. In some embodiments, one or more of the LTU electronics subassembly 600 components may be disposed on a first side 602 of the PCB 604.

Figure 6C:
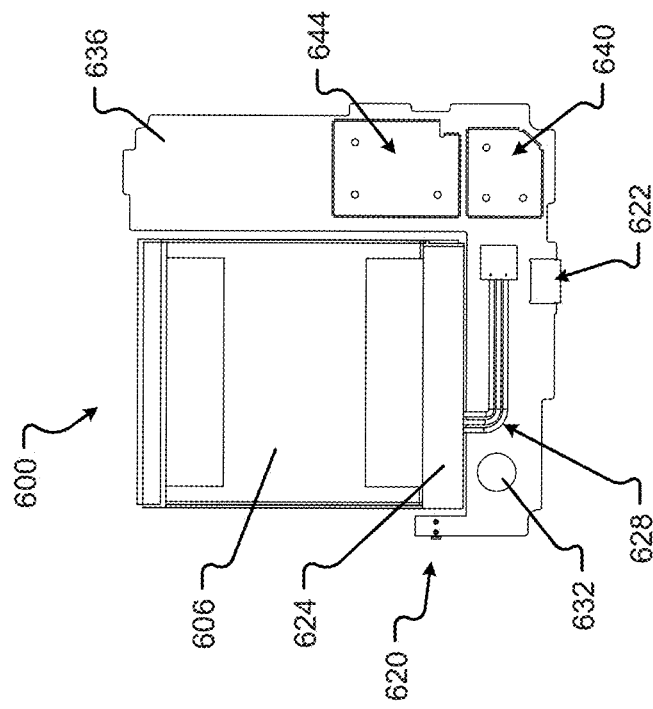
FIG. 6C shows a second plan view of the electronics subassembly opposite the first plan view shown in FIG. 6A.
Figure 6B:
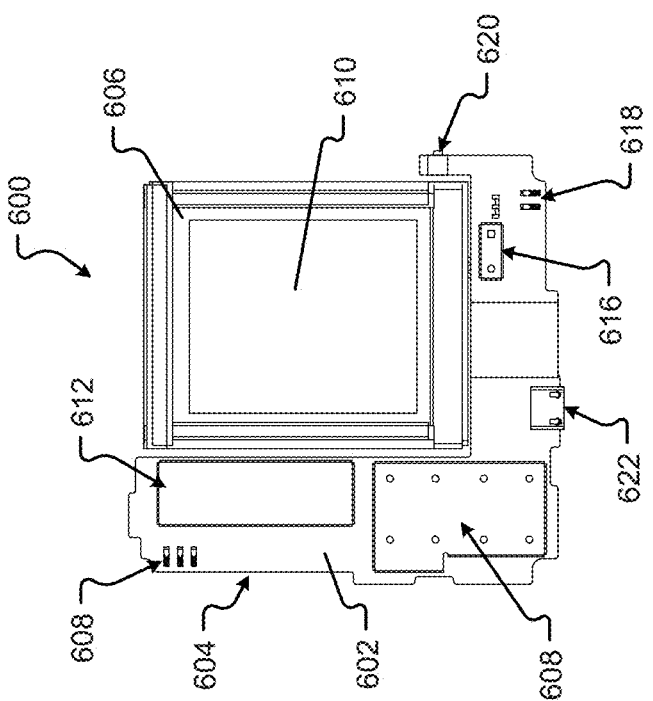
FIG. 6B shows a first plan view of the electronics subassembly of FIG. 6A.

As shown in FIGS. 6A and 6B, the various elements of the PCB 604 may be arranged to mitigate, reduce, and/or eliminate signal interference and/or noise between the components of the LTU 300. For instance, the first antenna 614 (e.g., the GSM antenna) may be disposed at a first corner of the PCB 604 while the GPS antenna 618 may be disposed at an opposite corner of the PCB 604 and the LTU 300. Additionally or alternatively, the battery 606 may be disposed in a path between the first antenna 614 and the GPS antenna 618. As can be appreciated, the arrangement depicted in illustrated in FIGS. 6A and 6B provide a tortuous path for signals from each antenna to interfere with one another. This tortuous path and arrangement of elements can prevent interference and/or noise in the system.

FIG. 6C shows the underside 636 of the LTU PCB 604 and electronics subassembly 600. As illustrated, the PCB 604 may include a power button area 632, power supply cabling 628 (e.g., wires, ribbon cable, flex ribbons, etc.), a battery connector 624, a sensor hub 640 and shielding, and a power management unit (PMU) 644 and shielding. The shielding associated with one or more of the components of the PCB 604 may provide electromagnetic interference (EMI) and/or radio frequency interference (RFI) shielding from internal and/or external sources.

Figure 6D:
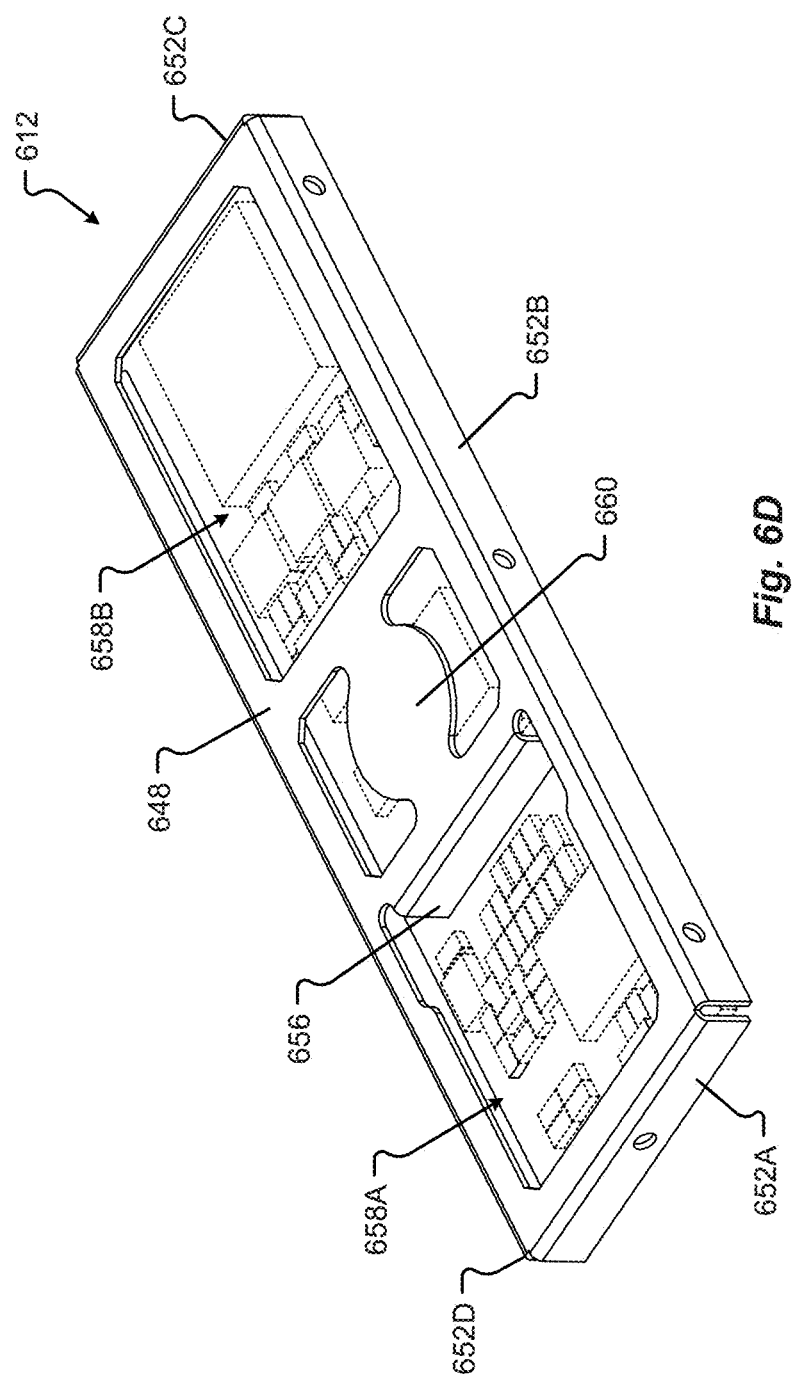
FIG. 6D shows a detail perspective view of a single-piece compartmentalized shielding frame of the electronics subassembly in accordance with embodiments of the present disclosure.

FIG. 6D shows a detail perspective view of a single-piece compartmentalized shielding frame 648 of the electronics subassembly in accordance with embodiments of the present disclosure. Although shown as associated with the first electronics and RF shielding 612, it should be appreciated that the single-piece compartmentalized shielding frame 648 may be associated with any group of components in the electronics subassembly 600 that could benefit from segregated compartmentalized shielding. The single-piece compartmentalized shielding frame 648 may be made from a metallized molded plastic or a sheet metal part. For instance, a sheet metal part may include a number of bent portions 652A-652D, 656 and cutouts 658A, 658B configured to shield one area (e.g., the electronics in the area associated with the first cutout 658A) from another area (e.g., the electronics in the area associated with the second cutout 658B). In some cases, the single-piece compartmentalized shielding frame 648 may include a portion of material 660 configured to cover one or more electronic components. These covered components may be determined to produce significant amounts of interference (e.g., EMI, RFI, etc.) and/or be susceptible to outside interference (e.g., EMI, RFI, etc.). In any event, each of the bent internal portions 656 of the frame 648 may physically separate components within different areas of the frame 648 from interfering with one another. The single-piece compartmentalized shielding frame 648 may be covered by a single-piece as shown in FIGS. 6A and 6B.

Figure 7:
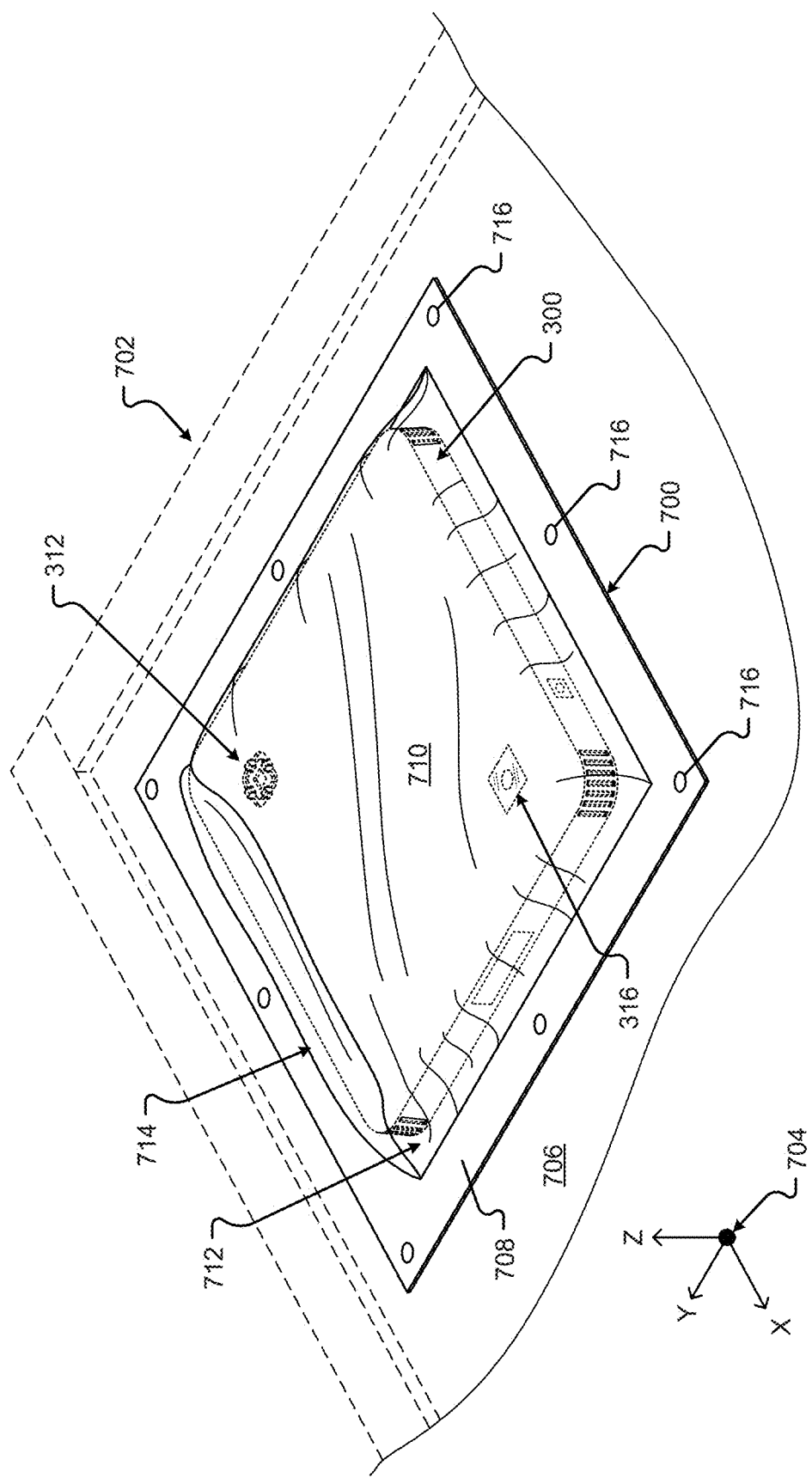
FIG. 7 shows a perspective view of a tamperproof sensor data permeable travel pouch for a logistics tracking unit in accordance with embodiments of the present disclosure.
Figure 8D:
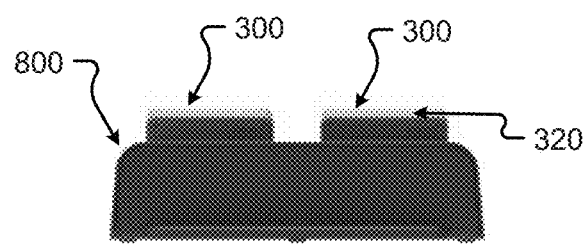
FIG. 8D shows a top end view of the logistics tracking unit charging system of FIG. 8A.
Figure 8E:
FIG. 8E shows a rear plan view of the logistics tracking unit charging system of FIG. 8A.
Figure 8F:
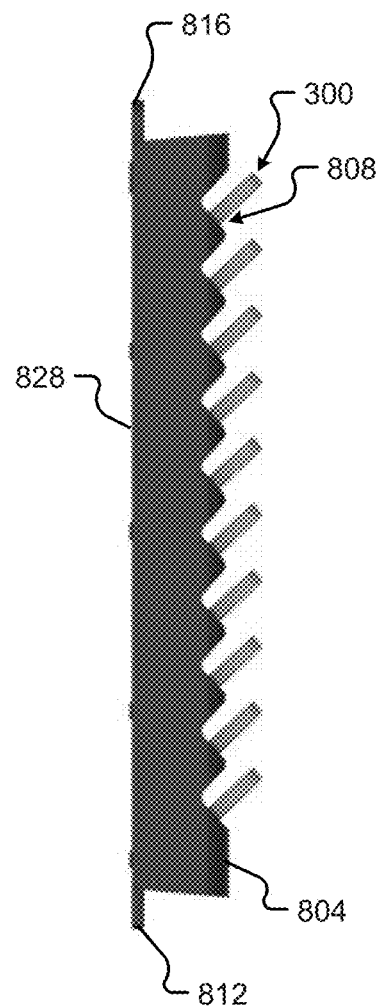
FIG. 8F shows a left end view of the logistics tracking unit charging system of FIG. 8A.

FIG. 7 shows a perspective view of a tamperproof sensor data permeable travel pouch 700 for an LTU 300 attached to a shipping object 702 in accordance with embodiments of the present disclosure. The shipping object 702 may be similar, if not identical, to the shipping object 104 described in conjunction with FIG. 1. In some embodiments, the travel pouch 700 may include a mounting area 708 surrounding at least a portion of the travel pouch 700 and having an adhesive layer disposed on a mounting surface facing a shipping object mount surface 706. The shipping object 702 may correspond to a pallet, box, package, or other object that can be transported from an origin to a destination. In one embodiment, prior to shipping, a backing layer may be separated from the adhesive layer and the mounting area 708 of the travel pouch 700 may be pressed against the mount surface 706 of the shipping object 702 to be tracked. Additionally or alternatively, the travel pouch 700 may be fastened, glued, or otherwise attached/secured to the shipping object 702 via one or more fastening elements 716. The fastening elements 716 may include, but are in no way limited to, rivets, screws, staples, nails, welds, etc.

Although shown mounted to an XY plane of the shipping object 702, it should be appreciated that the travel pouch 700 and LTU 300 may be oriented in any number of directions, planes, and/or axes 704. For example, the travel pouch 700 may be mounted to a shipping object 702 in the XY plane, XZ plane, and/or YZ plane as indicated by the axes 704.

In some embodiments, the travel pouch 700 may be configured to provide a secure attachment to the shipping object 702 while maintaining tracking and measurement accuracy. For instance, the travel pouch 700 may be made from a durable breathable, translucent, signal transmissive, material (e.g., plastic, nylon, para-aramid synthetic fiber, composite, cloth, and/or textile, etc.) configured to allow environmental and communications to permeate a cover 710 of the travel pouch 700 and reach the LTU 300. Among other things, the travel pouch 700 may allow air to pass freely from an internal space 712 of the travel pouch 700 to an external space outside the travel pouch 700 and in a shipping environment of the shipping object 702. This breathable material can allow the LTU 300 to take accurate pressure, humidity, and/or temperature readings as the LTU 300 is traveling. In addition, the travel pouch 700 may allow lighting conditions in a shipping environment to be observed by viewing the amount of light received by the ambient lighting sensor window 316 through the translucent travel pouch material. This ability allows the LTU 300 to detect whether an associated shipment is in a lit area (e.g., outside, in a lighted warehouse, etc.) or in an unlit area (e.g., in a cargo hold, in a vehicle, and/or in an unlighted warehouse, etc.) and send a message to a receiving system communicating this information. In any event, the information collected by the LTU 300 may be used to find a location of a package, determine if certain shipping requirements were met, and/or otherwise track conditions of a package during shipment.

The travel pouch 700 may include a flap 714 that can be opened to provide access to the internal space 712 of the travel pouch 700. Once opened, the LTU 300 may be inserted into the internal space 712 and the flap 714 may be closed and sealed against the cover 710 surface of the travel pouch 700. The flap 714 may include an adhesive layer disposed on at least one surface. The adhesive layer may be protected by a backing layer until the flap 714 is to be sealed, at which time, the backing layer may be removed exposing the adhesive layer. In one embodiment, the adhesive layer may be disposed on the cover 710. In any event, the flap 714 may be configured to only be sealed once. In some cases, the flap 714 cannot be resealed or removed from the cover 710 without indicating a possible tamper event has occurred. For example, an attempt to open a sealed flap 714 may result in damage to the flap 714, the cover 710, and/or some other portion of the travel pouch 700. The damage may serve to indicate that a tamper event occurred.

In some cases, the travel pouch 700 may include a tag disposed inside the internal space 712 configured to communicate with the LTU 300. This tag may be a simple magnetic token that is detected by a sensor or component of the LTU 300, indicating the LTU 300 has been inserted into the travel pouch 700. Once removed from the travel pouch 700, the LTU 300 may no longer detect the tag and report that the LTU 300 has been removed from the travel pouch 700. In response, the LTU 300 may enter a tamper or lockdown mode and may even be configured to report the possible tamper event via a message sent across a wireless communication network to at least one receiving device and/or server.

Charging Unit:

The LTU 300 may be charged alone or together with other tracking units via a charging system 800. The charging system 800 will be described in conjunction with FIGS. 8A-8F. The charging system 800 may include a body 804 comprising a number of charging slots 808 each configured to receive an LTU 300. In some embodiments, the charging slots 808 may be disposed at an angle relative to a rear surface 828 of the charging system 800 such that the LTU 300 may be at least partially retained in the charging slots 808 with the aid of gravity. Each LTU 300 may physically engage with a corresponding charging slot 808 and the terminals 344A, 344B of the engaged LTU 300 may be configured to contact, or electrically interconnect with, charging terminals inside the charging system 800. Through this electrical interconnection, the LTU 300 may be charged.

While the charging system 800 may be configured to charge one or more LTUs 300, the charging system 800 illustrated in FIGS. 8A-8F include twenty charging stations. It is an aspect of the present disclosure that more or fewer charging stations than illustrated in the accompanying figures may be included in the charging system 800.

The charging system 800 may include a first wall mount feature 812 (e.g., a lower mount bracket, etc.), a second wall mount feature 816 (e.g., an upper wall mount bracket, etc.) including a number of slots, holes, and/or other mounting features configured to secure the charging system 800 to a wall or other mount surface. In some embodiments, the charging system 800 may be hardwired into an electrical supply, include an alternating current (AC) input port, a direct current (DC) input port, a stepdown transformer, an AC to DC converter, and/or other electrical supply connection.

In some embodiments, the charging system 800 may include at least one charging indicator 820. The charging indicator may be configured to output a specific color, flash, stay solid, and/or combinations thereof. In one embodiment, the charging indicator 820 may change color to indicate a state of charge for one or more of the LTUs 300 engaged with the charging stations. While each LTU indicator 320 may be used to visually display and/or indicate a state of charge associated with an individual LTU 300, the charging indicator 820 of the charging system 800 may indicate a state of charge for the group of LTUs 300 engaged with the charging stations. By way of example, the charging indicator 820 may illuminate a particular color (e.g., green) only when all of the LTUs in the charging system 800 are fully charged (or are charged at an acceptable shipping charge level). This approach can allow a monitoring user or a machine to determine that a particular set of LTUs 300 are ready for shipping. Additionally or alternatively, this approach can allow a monitoring user or a machine to determine when a charging system 800 is available to charge a new set of LTUs 300. In some embodiments, the charging indicator 820 may illuminate a particular color (e.g., green) when a select group of LTUs 300 in the charging system 800 are charged (e.g., a group of LTUs 300 associated with a particular shipment, etc.). Additionally or alternatively, the charging indicator 820 may illuminate when at least one LTU 300 in the charging system 800 is charged.

The charging system 800 may include a communication module that is configured to communicate with a charge monitoring server across a wireless communication network to alert the charge monitoring server of any status associated with one or more LTUs 300 in the charging system 800. As can be appreciated, the charge monitoring server may be configured to receive messages from multiple charging systems 800 regarding the state of charge associated with LTUs 300 engaged therewith.

Figure 9:
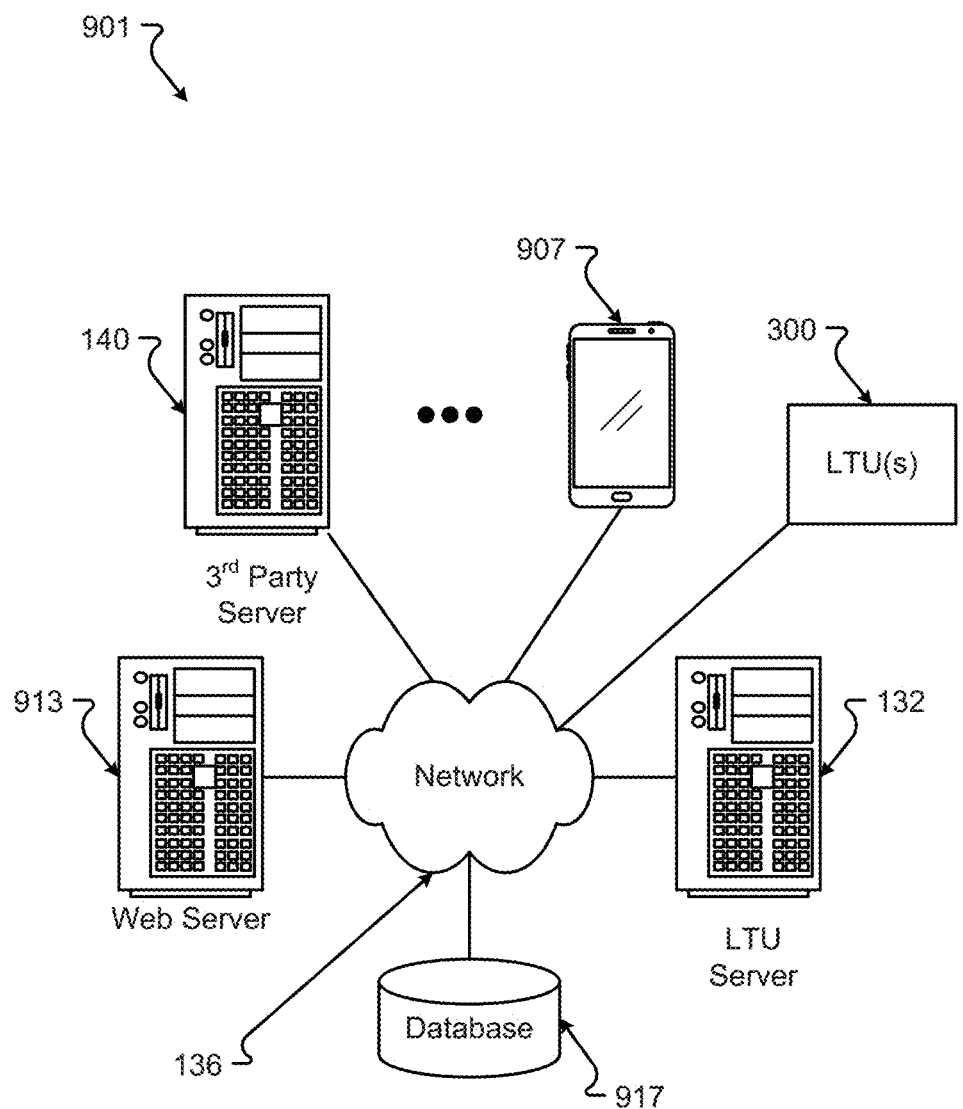
FIG. 9 show a computing environment of the LTU in accordance with embodiments of the present disclosure.

LTU Environment:

FIG. 9 illustrates a block diagram of a computing environment 901 that may function as the servers, LTUs, user computers, or other systems provided and described above. The environment 901 includes one or more user computer, or computing devices, such as a LTU 300, a communication device 907, third-party server 140, etc. The computing devices 300, 907, 140 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNI9® or other operating systems. These computing devices 300, 907, 140 may also have any of a variety of applications, including for example, database client and/or server applications, and web browser applications. Alternatively, the computing devices 300, 907, 140 may be any other electronic device, such as a thin-client computer, Internet-enabled mobile telephone, an LTU, and/or personal digital assistant, capable of communicating via a network 136, sending or receiving logistics information or commands, and/or displaying and navigating web pages or other types of electronic documents. Although the exemplary computer environment 901 is shown with three computing devices, any number of user computers or computing devices may be supported.

Environment 901 further includes a network 136. The network 136 may can be any type of network familiar to those skilled in the art that can support data communications using any of a variety of commercially-available protocols, including without limitation SIP, TCP/IP, SNA, IPX, AppleTalk, and the like. Merely by way of example, the network 136 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the Bluetooth® protocol known in the art, and/or any other wireless protocol); and/or any combination of these and/or other networks.

The system 901 may also include one or more servers 913, 132. In this example, server 913 is shown as a web server and server 132 is shown as an application server, or more particularly, a LTU server 132. The web server 913, which may be used to process requests for web pages or other electronic documents from computing devices 300, 907, 140. The web server 913 can be running an operating system including any of those discussed above, as well as any commercially-available server operating systems. The web server 913 can also run a variety of server applications, including SIP servers, HTTP servers, FTP servers, CGI servers, database servers, Java servers, and the like. In some instances, the web server 913 may publish operations available operations as one or more web services.

The environment 901 may also include one or more file and or/application servers 132, which can, in addition to an operating system, include one or more applications accessible by a client running on one or more of the computing devices 300, 907, 140. The server(s) 132 and/or 913 may be one or more general purpose computers capable of executing programs or scripts in response to the computing devices 300, 907, 140. As one example, the server 132, 913 may execute one or more web applications. The web application may be implemented as one or more scripts or programs written in any programming language, such as Java™, C, C#®, or C++, and/or any scripting language, such as Perl, Python, or TCL, as well as combinations of any programming/scripting languages. The application server(s) 132 may also include database servers, including without limitation those commercially available from Oracle, Microsoft, Sybase™ IBM™ and the like, which can process requests from database clients running on a computing device 300, 907, 140.

The web pages created by the server 913 and/or 132 may be forwarded to a computing device 300, 907, 140 via a web (file) server 913, 132. Similarly, the web server 913 may be able to receive web page requests, web services invocations, and/or input data from a computing device 300, 907, 140

(e.g., a user computer, etc.) and can forward the web page requests and/or input data to the web (application) server 132. In further embodiments, the server 132 may function as a file server. Although for ease of description, FIG. 9 illustrates a separate web server 913 and file/application server 132, those skilled in the art will recognize that the functions described with respect to servers 913, 132 may be performed by a single server and/or a plurality of specialized servers, depending on implementation-specific needs and parameters. The computer systems 300, 907, 140, web (file) server 913 and/or web (application) server 132 may function as the system, devices, or components described in FIGS. 1-8F and/or 10-17.

The environment 901 may also include a database 917. The database 917 may reside in a variety of locations. By way of example, database 917 may reside on a storage medium local to (and/or resident in) one or more of the computers 300, 907, 140, 913, 132. Alternatively, it may be remote from any or all of the computers 300, 907, 140, 913, 132, and in communication (e.g., via the network 136) with one or more of these. The database 917 may reside in a storage-area network ("SAN") familiar to those skilled in the art. Similarly, any necessary files for performing the functions attributed to the computers 300, 907, 140, 913, 132 may be stored locally on the respective computer and/or remotely, as appropriate. The database 917 may be a relational database, such as Oracle 20i®, that is adapted to store, update, and retrieve data in response to SQL-formatted commands.

Figure 10:
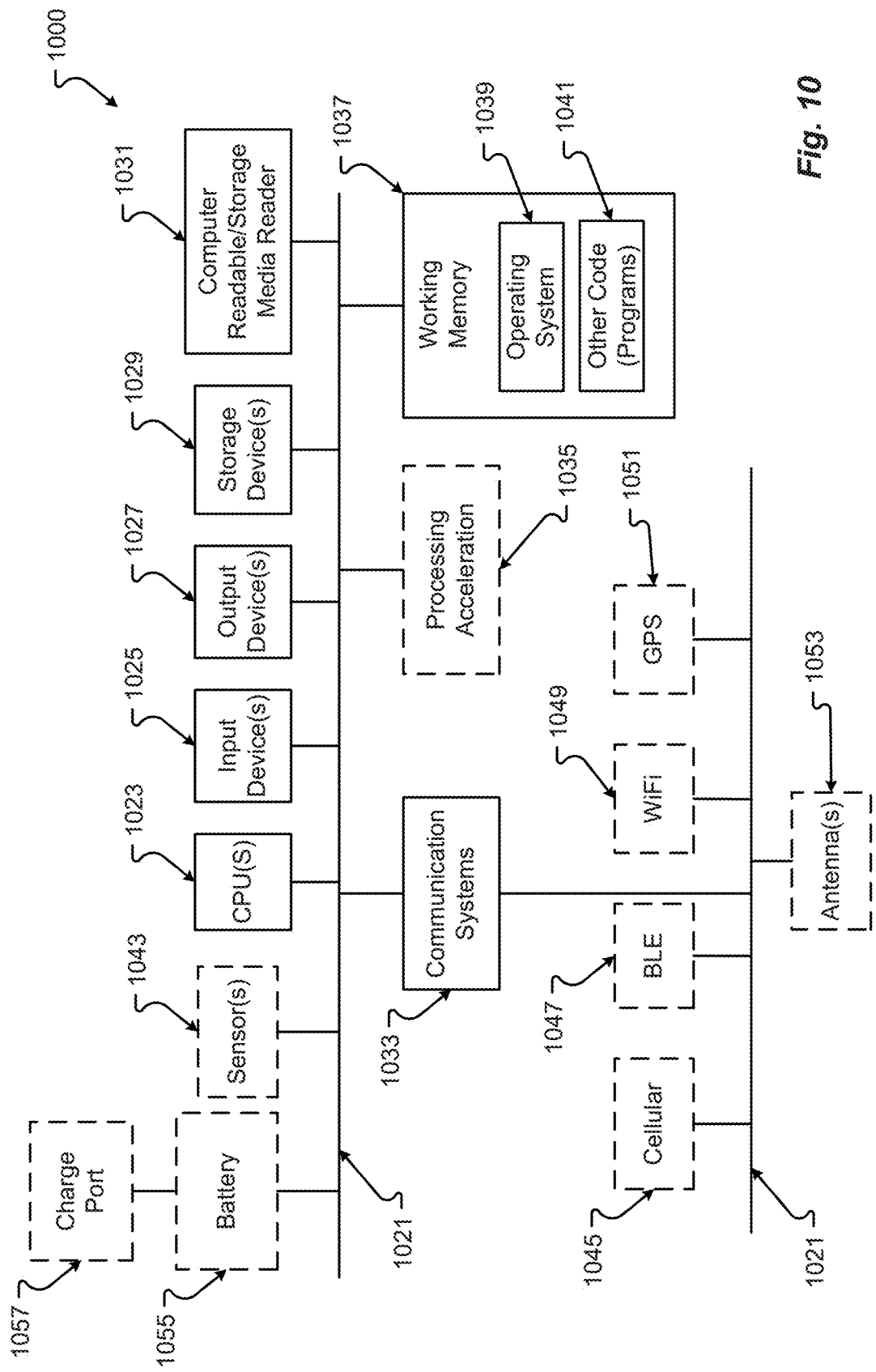
FIG. 10 shows a hardware diagram for the LTU or other computer systems associated with the LTU system in accordance with embodiments of the present disclosure.

LTU and/or Server Hardware:

FIG. 10 illustrates one embodiment of a computer system 1000 upon which the servers, user computers, computing devices, LTUS, or other systems or components described above may be deployed or executed. The computer system 10 is shown comprising hardware elements that may be electrically coupled via a bus(ses) 1021. Some hardware elements, represented by dashed boxes, may be optional or specific to one of the devices, e.g., the LTU. The hardware elements may include one or more central processing units (CPUs) 1023; one or more input devices 1025 (e.g., a mouse, a keyboard, etc.); and one or more output devices 1027 (e.g., a display device, a printer, etc.). The computer system 10 may also include one or more storage devices 1029. By way of example, storage device(s) 1029 may be disk drives, optical storage devices, solid-state storage devices such as a random access memory ("RAM") and/or a read-only memory ("ROM"), which can be programmable, flash-updateable and/or the like.

The computer system 10 may additionally include a computer-readable storage media reader 1031; a communications system 1033 (e.g., a modem, a network card (wireless or wired), an infra-red communication device, etc.); and working memory 1037, which may include RAM and ROM devices as described above. The computer system 10 may also include a processing acceleration unit 1035, which can include a DSP, a special-purpose processor, and/or the like.

The computer-readable storage media reader 1031 can further be connected to a computer-readable storage medium, together (and, optionally, in combination with storage device(s) 1029) comprehensively representing remote, local, fixed, and/or removable storage devices plus storage media for temporarily and/or more permanently containing computer-readable information. The communications system 1033 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 10 may also comprise software elements, shown as being currently located within a working memory 1037, including an operating system 1039 and/or other code 1041. It should be appreciated that alternate embodiments of a computer system 10 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 1023 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The computer system 1000 may include one or more sensors and systems 304, sensor processors 1043, communications subsystem 1033 connected to one or more different communication media (e.g., a cellular communication system 1045, a BlueTooth® or BlueTooth® Low Energy (BLE) communication system, a WiFi® communication system, etc.), a positioning system 1051 (e.g., a global positioning satellite (GPS) system), one or more antenna 1053, a battery 1055, and/or a charging port 1057. These associated components may be electrically and/or communicatively coupled to one another via at least one bus 10221 to distribute power and/or communication signals.

In accordance with at least some embodiments of the present disclosure, the communication system 1033 may utilize or communication using any type of known communication medium or collection of communication media and may use any type of protocols, such as SIP, TCP/IP, SNA, IPX, AppleTalk, and the like, to transport messages between endpoints. The communication system 1033 may use wired and/or wireless communication technologies to communicate over communication network 136. The Internet is an example of the communication network 136 that constitutes an Internet Protocol (IP) network consisting of many computers, computing networks, and other communication devices located all over the world, which are connected through many telephone systems and other means. Other examples of the communication network 136 include, without limitation, a standard Plain Old Telephone System (POTS), an Integrated Services Digital Network (ISDN), the Public Switched Telephone Network (PSTN), a Local Area Network (LAN), such as an Ethernet network, a Token-Ring network and/or the like, a Wide Area Network (WAN), a virtual network, including without limitation a virtual private network ("VPN"); the Internet, an intranet, an extranet, a cellular network, an infra-red network; a wireless network (e.g., a network operating under any of the IEEE 802.11 suite of protocols, the Bluetooth® protocol known in the art, and/or any other wireless protocol), and any other type of packet-switched or circuit-switched network known in the art and/or any combination of these and/or other networks. In addition, it can be appreciated that the communication network 352 need not be limited to any one network type, and instead may be comprised of a number of different networks and/or network types. The communication network 352 may comprise a number of different communication media such as coaxial cable, copper cable/wire, fiber-optic cable, antennas for transmitting/receiving wireless messages, and combinations thereof.

The communication system 1033 can utilize one or more communication subsystems to communicate over the communication network 136. For example, the cellular system 1045 can be used to communicate through an antenna 1053 to a cellular system 112. The BLE system 1047 can be used to communicate to over a Bluetooth® connection, and the WiFi® system 1049 can be used to communicate over the WiFi® communication system 116. Any of the systems 1045, 1047, 1049 may use an antenna 1053 for transmitting wireless signals.

The communications componentry can include one or more wired or wireless devices such as a transceiver(s) and/or modem that allows communications not only between the various systems disclosed herein but also with other devices, such as devices on a network, and/or on a distributed network such as the Internet and/or in the cloud. The communications subsystem 1033 can also include inter- and intra-communications capabilities such as hotspot and/or access point connectivity.

Additionally, and while not specifically illustrated, the communications subsystem can include one or more communications links (that can be wired or wireless) and/or communications busses (managed by the bus manager 1974), including one or more of CANbus, OBD-II, ARCINC 429, Byteflight, CAN (Controller Area Network), D2B (Domestic Digital Bus), FlexRay, DC-BUS, IDB-1394, IEBus, I2C, ISO 9141-1/-2, J1708, J1587, J1850, J1939, ISO 11783, Keyword Protocol 2000, LIN (Local Interconnect Network), MOST (Media Oriended Systems Transport), Multifunction Vehicle Bus, SMARTwireX, SPI, VAN (Vehicle Area Network), and the like or in general any communications protocol and/or standard. The various protocols and communications can be communicated one or more of wirelessly and/or over transmission media (sometimes when physically connected to a port in the LTU 300) such as single wire, twisted pair, fiber optic, IEEE 1394, MIL-STD-1553, MIL-STD-1773, power-line communication, or the like. (All of the above standards and protocols are incorporated herein by reference in their entirety)

As discussed, the communications subsystem 1033 enables communications between any if the inter-systems and subsystems as well as communications with non-collocated resources, such as those reachable over a network such as the Internet. The communications subsystem 1033, in addition to well-known componentry (which has been omitted for clarity), can include interconnected elements including one or more of, but not limited to: one or more antennas 1053, an interleaver/deinterleaver, an analog front end (AFE), memory/storage/cache, MAC circuitry, modulator/demodulator, encoder/decoder, a plurality of connectivity managers, GPU, accelerator, a multiplexer/demultiplexer, transmitter, receiver and wireless radio components such as a Wi-Fi PHY/Bluetooth® module, a Wi-Fi/BT MAC module, transmitter and receiver. The various elements in the computer system 1000 are connected by one or more links/busses 1021 (not shown, again for sake of clarity).

The computer system 1000 can have one more antennas 1053, for use in wireless communications such as multi-input multi-output (MIMO) communications, multi-user multi-input multi-output (MU-MIMO) communications Bluetooth®, LTE, 4G, 5G, Near-Field Communication (NFC), etc. The antenna(s) 1053 can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas.

Antenna(s) 1053 generally interact with the AFE, which is needed to enable the correct processing of the received modulated signal and signal conditioning for a transmitted signal. The AFE can be functionally located between the antenna and a digital baseband system in order to convert the analog signal into a digital signal for processing and vice-versa.

The controller/microprocessor 1023 may comprise a general purpose programmable processor or controller for executing application programming or instructions related to the computer system 1000. Furthermore, the controller/microprocessor 1023 can perform operations for configuring and transmitting/receiving information as described herein. The controller/microprocessor 1023 may include multiple processor cores, and/or implement multiple virtual processors. Optionally, the controller/microprocessor 1023 may include multiple physical processors. By way of example, the controller/microprocessor 1023 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The computer system 1000 can further include a transmitter and receiver which can transmit and receive signals, respectively, to and from other devices, subsystems and/or other destinations using the one or more antennas 1053 and/or links/busses. Included in the communication system 1033 circuitry is the medium access control or MAC Circuitry. MAC circuitry provides for controlling access to the wireless medium. In an exemplary embodiment, the MAC circuitry may be arranged to contend for the wireless medium and configure frames or packets for communicating over the wireless medium.

The computer system 1000 can also optionally contain a security module (not shown). This security module can contain information regarding but not limited to, security parameters required to connect the device to one or more other devices or other available network(s), and can include WEP or WPA/WPA-2 (optionally+AES and/or TKIP) security access keys, network keys, etc. The WEP security access key is a security password used by Wi-Fi networks. Knowledge of this code can enable a wireless device to exchange information with an access point and/or another device. The information exchange can occur through encoded messages with the WEP access code often being chosen by the network administrator. WPA is an added security standard that is also used in conjunction with network connectivity with stronger encryption than WEP. The computer system 1000 also includes a Wi-Fi/BT/BLE PHY module and a Wi-Fi/BT/BLE MAC module and wireless transmitter and receiver.

The various connectivity managers manage and/or coordinate communications between the computer system 1000 and one or more of the systems disclosed herein and one or more other devices/systems. The connectivity managers include a charging connectivity manager, a database connectivity manager, a remote operating system connectivity manager, a sensor connectivity manager, etc.

The database connectivity manager allows the computer system 1000 to receive and/or share information stored in a database. This information can be shared with other components/subsystems and/or other entities, such as third parties. The information can also be shared with one or more devices, such as an app on a mobile device the client uses to track information about the LTU 300. In general, any information stored in the database can optionally be shared with any one or more other devices optionally subject to any privacy or confidentially restrictions.

The remote operating system connectivity manager facilitates communications between the LTU 300 and any one or more other systems. These communications can include one or more of navigation information, operational information, sensor information, or in general any information related to the operation of the LTU 300.

The sensor connectivity manager facilitates communications between any one or more of the sensors 1043 and any one or more of the other systems. The sensor connectivity manager can also facilitate communications between any one or more of the sensors 1043 and/or connected systems and any other destination, such as a third-party 140, app, or in general to any destination where sensor data is needed.

The communications subsystem can also optionally manage one or more identifiers, such as an IP (internet protocol) address(es), associated with the LTU 300 and one or other system or subsystems or components therein. These identifiers can be used in conjunction with any one or more of the connectivity managers as discussed herein.

The navigation sensor 1051 may include one or more sensors having receivers and antennas that are configured to utilize a satellite-based navigation system including a network of navigation satellites capable of providing geolocation and time information to at least one component of the computer system 1000. Examples of the navigation sensor 1051, as described herein, may include, but are not limited to, at least one of Garmin® GLO™ family of GPS and GLONASS combination sensors, Garmin® GPS 15x™ family of sensors, Garmin® GPS 16x™ family of sensors with high-sensitivity receiver and antenna, Garmin® GPS 18x OEM family of high-sensitivity GPS sensors, Dewetron DEWE-VGPS series of GPS sensors, GlobalSat 1-Hz series of GPS sensors, other industry-equivalent navigation sensors and/or systems, and may perform navigational and/or geolocation functions using any known or future-developed standard and/or architecture. Other positioning sensors 1051 sensors may be used with other types of satellite systems, for example, a global navigation satellite system (GNSS) similar, if not identical, to NAVSTAR GPS, GLONASS, EU Galileo, and/or the BeiDou Navigation Satellite System (BDS) to name a few.

The sensors 1043 may include one or more of, but is not limited to, an orientation sensor, an odometry sensor, an infrared (IR) sensor, a motion sensor, a vibration or shock sensor, an environmental sensor, and/or other sensors or sensor systems. Some sensor group or types may comprise sensors configured to collect data relating to the environment around the LTU 300. Examples of environmental sensors may include, but are not limited to, oxygen/air sensors, temperature sensors, humidity sensors, light/photo sensors, pressure sensors, and more. The oxygen/air sensors may be configured to detect a quality or presence of the air at the LTU location (e.g., ratios and/or types of gasses comprising the air, dangerous gas levels, safe gas levels, etc.). Temperature sensors may be configured to detect temperature readings surrounding the LTU 300 or of the LTU 300. Humidity sensors may detect an amount of water vapor or water present in or around the LTU 300. The light/photo sensors can detect an amount of light present in around the LTU 300. Further, the light/photo sensors may be configured to detect various levels of light intensity associated with light around the LTU 300. Thus, the LTU 300 can determine if it is outside or inside a building, structure, and/or container. The pressure sensor can determine a barometric pressure or changes thereto. As such, the LTU 300 can determine changes in elevation or weather conditions effecting the LTU 300. In other configurations, the pressure sensor can also measure rapid increases or decreases in pressure caused by explosions, loss of cabin pressure in an airplane, submersion, etc.

Examples of other sensors may include, but are not limited to, infrared sensors, motion sensors, wireless network sensors, camera (or image) sensors, audio sensors, and more. IR sensors may be used to measure IR light irradiating from at least one surface or another object around the LTU 300.

Among other things, the IR sensors may be used to measure temperatures, form images (especially in low light conditions), and even detect motion around the LTU 300. The motion sensors may be similar to motion detectors. The infrared (IR) sensors may include one or more components configured to detect image information associated with an environment of the LTU 300. The IR sensors may be configured to detect targets in low-light, dark, or poorly-lit environments. The IR sensors may include an IR light emitting element (e.g., IR light emitting diode (LED), etc.) and an IR photodiode. In some embodiments, the IR photodiode may be configured to detect returned IR light at or about the same wavelength to that emitted by the IR light emitting element. In some embodiments, the IR sensors may include at least one processor configured to interpret the returned IR light and determine locational properties of targets. The IR sensors may be configured to detect and/or measure a temperature associated with a target (e.g., an object, pedestrian, other vehicle, etc.). Examples of IR sensors as described herein may include, but are not limited to, at least one of Opto Diode lead-salt IR array sensors, Opto Diode OD-850 Near-IR LED sensors, Opto Diode SA/SHA727 steady state IR emitters and IR detectors, FLIR® LS microbolometer sensors, FLIR® TacFLIR 380-HD InSb MWIR FPA and HD MWIR thermal sensors, FLIR® VOx 640×480 pixel detector sensors, Delphi IR sensors, other industry-equivalent IR sensors and/or systems, and may perform IR visual target and/or obstacle detection in an environment around the LTU 300 using any known or future-developed standard and/or architecture.

The LTU 300 may include a wireless network sensor. This sensor may be configured to detect one or more wireless network(s) around the LTU 300. Examples of wireless networks may include, but are not limited to, wireless communications utilizing Bluetooth®, Wi-Fi™ ZigBee, IEEE 802.11, and other wireless technology standards. For example, a mobile hotspot may be detected around the LTU 300 via the wireless network sensor 752. In this case, the LTU 300 may determine to utilize the mobile hotspot detected via/with one or more other devices 1033, 1049 and/or components associated with the LTU 300.

The camera sensors may be image sensors or image/video capture technologies. Optionally, the camera sensors may record still images, video, and/or combinations thereof. The audio sensors may be configured to receive audio input from around the LTU 300. The audio input may correspond to voice commands, conversations detected around the LTU 300, phone calls made around the LTU 300, and/or other audible expressions made around the LTU 300. Further, the audio sensors can record ambient sound around the LTU 300 to determine other environment information.

The sensors may also include force sensors to detect a force observed on the LTU 300. One example of a force sensor may include a force transducer that converts measured forces (e.g., force, weight, pressure, etc.) into output signals. Further, mechanical motion sensors can be included and may correspond to encoders, accelerometers, damped masses, and the like. Optionally, the mechanical motion sensors may be adapted to measure the force of gravity (i.e., G-force) as observed on the LTU 300. Measuring the G-force observed on the LTU 300 can provide valuable information related to a LTU's acceleration, deceleration, collisions, and/or forces that may have been suffered by the LTU 300.

Other sensors can include orientation sensors, which can include accelerometers, gyroscopes, magnetic sensors, and the like that are configured to detect an orientation associated with the LTU 300 relative to at least one reference point. In some embodiments, the orientation sensor may include at least one pressure transducer, stress/strain gauge, accelerometer, gyroscope, and/or geomagnetic sensor.

Optionally, the sensors may be configured to collect data relating to one or more conditions, objects, vehicles, and other events that are external to the LTU 300. For instance, the force sensors may detect and/or record force information associated with the outside of a LTU 300. For instance, if an object strikes the exterior of the LTU 300, the force sensors may determine a magnitude, location, and/or time associated with the strike.

The odometry sensor and/or system may include one or more components that is configured to determine a change in position of the LTU 300 over time. In some embodiments, the odometry system may utilize data from one or more other sensors and/or systems in determining a position (e.g., distance, location, etc.) of the LTU 300 relative to a previously measured position for the LTU 300. Additionally or alternatively, the odometry sensors may include one or more encoders, Hall speed sensors, and/or other measurement sensors/devices configured to measure a wheel speed, rotation, and/or number of revolutions made over time. Examples of the odometry sensor/system as described herein may include, but are not limited to, at least one of Infineon TLE4924/26/27/28C high-performance speed sensors, Infineon TL4941plusC(B) single chip differential Hall wheel-speed sensors, Infineon TL5041plusC Giant Magnetoresistance (GMR) effect sensors, Infineon TL family of magnetic sensors, EPC Model 25SP Accu-CoderPro™ incremental shaft encoders, EPC Model 30M compact incremental encoders with advanced magnetic sensing and signal processing technology, EPC Model 925 absolute shaft encoders, EPC Model 958 absolute shaft encoders, EPC Model MA36S/MA63S/SA36S absolute shaft encoders, Dynapar™ F18 commutating optical encoder, Dynapar™ HS35R family of phased array encoder sensors, other industry-equivalent odometry sensors and/or systems, and may perform change in position detection and/or determination functions using any known or future-developed standard and/or architecture.

In some embodiments, the sensors and systems 304 may include other sensors 1043 and/or combinations of the sensors described above. Additionally or alternatively, one or more of the sensors 1043 described above may include one or more processors configured to process and/or interpret signals detected by the one or more sensors 1043. In some embodiments, the processing of at least some sensor information provided by the sensors and systems 1043 may be processed by at least one sensor processor 1043. Raw and/or processed sensor data may be stored in a sensor data memory storage medium 1037. In some embodiments, the sensor data memory may store instructions used by the sensor processor for processing sensor information provided by the sensors and systems 1043. In any event, the sensor data memory may be a disk drive, optical storage device, solid-state storage device such as a random access memory ("RAM") and/or a read-only memory ("ROM"), which can be programmable, flash-updateable, and/or the like.

The processor 1023 may receive processed sensor information from the sensor processor and determine to control an aspect of the LTU 300. Controlling an aspect of the LTU 300 may include communicating or presenting information via a communication system 1033 or output 1027 (e.g., illuminating an light emitting diode (LED)). In this example, the processor 1023 may receive sensor data describing an environment surrounding the LTU 300 and, based on the sensor data received, determine to adjust the performance of the LTU 300.

The processor 1023 may communicate, in real-time, with the sensors and systems 1043 forming a feedback loop. In particular, upon receiving sensor information describing a condition in the environment surrounding the LTU 300, the processor 1023 may autonomously make changes to an operation of the LTU 300. The processor 1023 may then receive subsequent sensor information describing any change to the condition of the environment. This continual cycle of observation (e.g., via the sensors, etc.) and action (e.g., selected control or non-control of operations, etc.) allows the LTU 300 to operate autonomously in the environment.

In some embodiments, the processor 1023 may receive control information from one or more control sources. The control source may provide a command(s) and/or control information including operational commands, operation override control commands, and the like. The control source may correspond to an LTU server 132, a traffic control system, an administrative control entity, and/or some other controlling server. It is an aspect of the present disclosure that the processor 1023 and/or other components of the LTU 300 may exchange communications with the control source across the communication network 136 and via the communications subsystem 1033.

Information associated with controlling the LTU 300 may be stored in a control data memory 1037 storage medium. The control data memory 1037 may store instructions used by the processor 1023 for controlling the LTU 300, historical control information, control rules, and the like. In some embodiments, the control data memory 1037 may be a disk drive, optical storage device, solid-state storage device such as a random access memory ("RAM") and/or a read-only memory ("ROM"), which can be programmable, flash-updateable, and/or the like.

In addition to the mechanical components described herein, the LTU 300 may include a number of user interface devices. The user interface devices receive and translate input into a mechanical movement or electrical signal or stimulus. The input may be one or more of motion, voice, touch, and/or physical interaction with the components of the LTU 300. In some embodiments, the input may be configured to control one or more functions of the LTU 300 and/or systems of the LTU 300 described herein. User interfaces may include, but are in no way limited to, at least one graphical user interface of a display device, a touch mechanism, power control switch, communications equipment, etc.

An embodiment of the electrical system associated with the LTU 300 can include a power source(s) that generates power, power storage that stores power 1055, and/or load(s) that consume power. Power storage may be associated with a power storage system 1055. The electrical system may be managed by a power management controller (PMC). Further, the electrical system can include one or more other interfaces or controllers.

The power management controller can be a computer, computing system(s), software, and/or electrical system with associated components, as described herein, capable of managing the functions to receive power, routing the power to the power storage (e.g., battery 1055), and then providing the power from the battery 1055 to the loads. Thus, the power management controller may execute programming that controls switches, devices, components, etc. involved in the reception, storage, and provision of the power in the electrical system.

The battery 1055 can be any type of battery for storing electrical energy, for example, a lithium ion battery, a lead acid battery, a nickel cadmium battery, etc. Further, the battery 1055 may include different types of power storage systems, such as, ionic fluids or other types of fuel cell systems. The battery 1055 may also include one or more high-capacity capacitors. The capacitors may be used for long-term or short-term storage of electrical energy. The input into the battery 1055 may be different from the output, and thus, the capacitor may be charged quickly but drain slowly. The functioning of any converter, battery capacitor, etc. may be monitored or managed by the PMC. Further, the battery 1055 may be electrically connected to a charge port 21057, which can be any physical connector, that connects to an outside source of power (an electrical distribution system) to charge the battery 1055.

Figure 11:
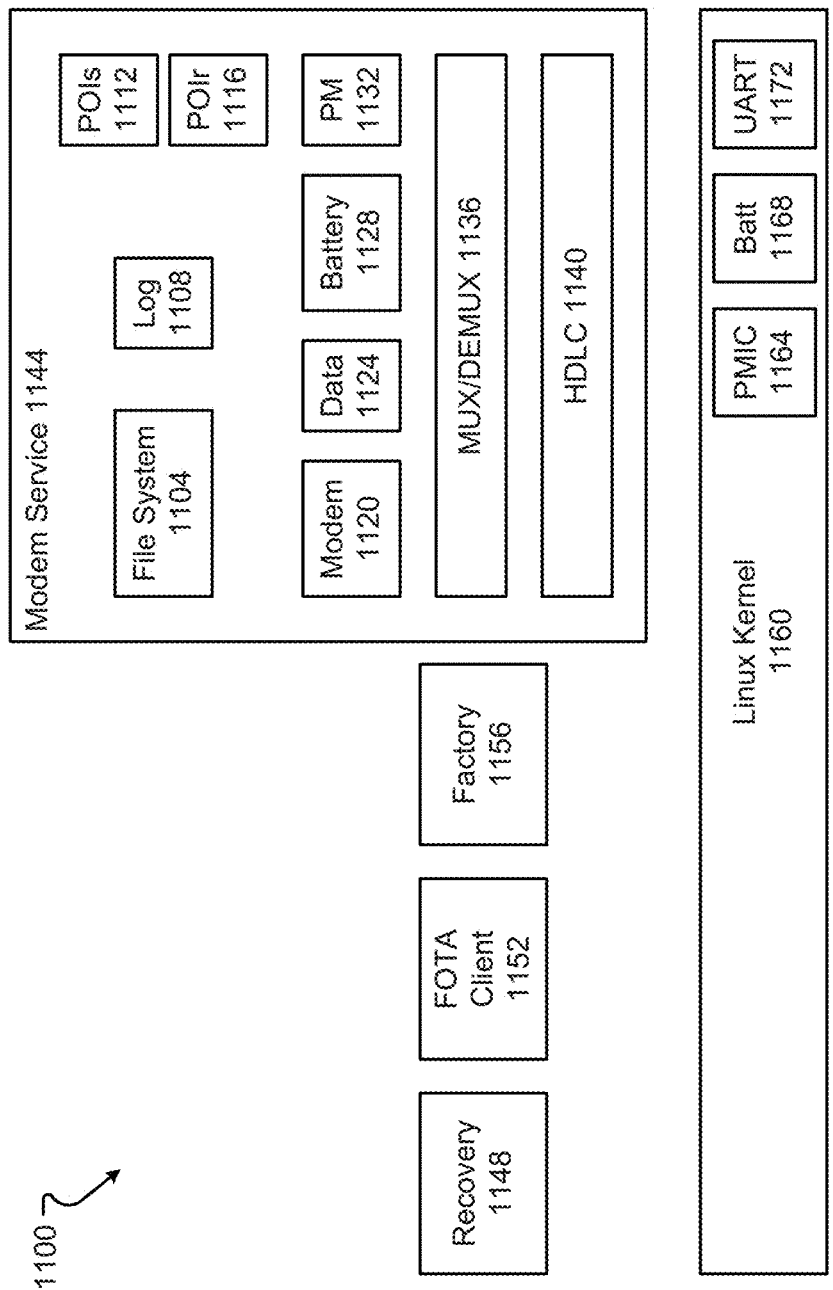
FIG. 11 shows a software/hardware diagram for the LTU in accordance with embodiments of the present disclosure.
Figure 12:
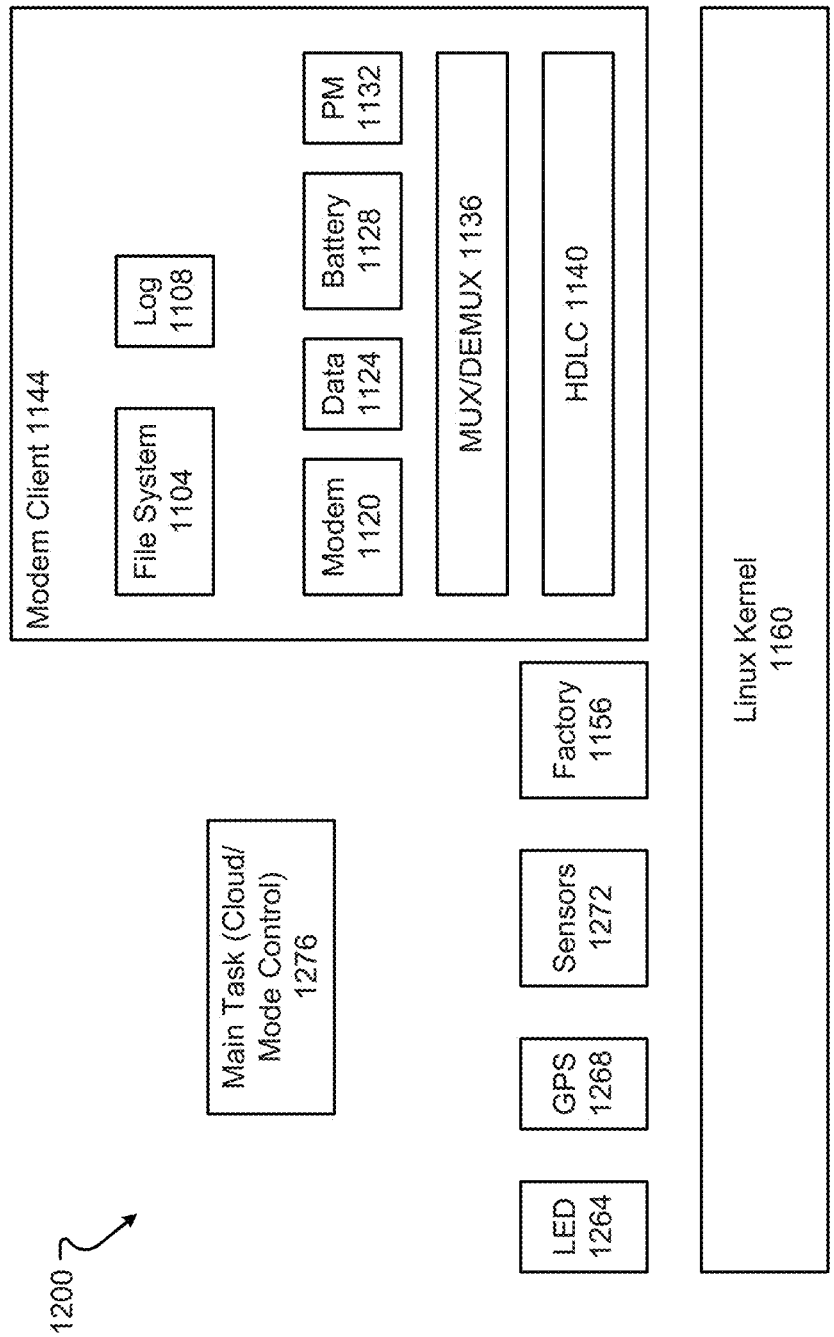
FIG. 12 shows another software/hardware diagram for the LTU in accordance with embodiments of the present disclosure.

LTU Software:

An embodiment of software 1100/1200 that may function on the processor 1023 may be as shown in FIG. 11 and/or FIG. 12. While the components in FIGS. 11 and 12 are described as software, the functions described can be embodied as gates in an ASIC, FPGA, or other processor. As such, the software functions 1100/1200 may be embodied as hardware in some configurations. The software can include one or more of, but is not limited to: a modem service 1144, an operating system (LINUX kernel 1160), a recovery function 1148, a Firmware Over-The-Air (FOTA) client 1152, a factory function 1156, an LED function 1264, a GPS function 1268, a sensor function 1272, and/or a main task (cloud mode control) function 1276. In some configurations, the software/hardware 1100 may function on a physical separate processor 11233 from the hardware/software 1200.

In other configurations, the hardware/software 1100, 1200 execute on a single processor but in separate partitions.

The modem server 1144 can include various functionality. For example, the modem functionality 114 can include one or more of, but is not limited to: a file system 1104, a log 1108, a parallel optical interface (POI) 1112, 1116, a modem 1120, a data function 1124, a battery function 1128, a power management (PM) function 1132, a MUX12/DEMUX 1236, and/or a HDLC 1240. These various functions will be explained hereinafter.

The file system 1104 can be any file system or filesystem that is used to control how data is stored and retrieved. The file system 1104 separates the data into pieces and gives each piece a name, the information is easily isolated and identified. The file system 1104 includes a structure and logic rules used to manage the groups of information and the names of the information. An example file system 1104 can be the Apache Hadoop File System, the Microsoft Resilient File System, and/or Apple's Hierarchical File System. Any file system can be used for file system 1104 to organize the LTU sensor data or other information.

A log 1108 can include any data sequentially stored by the LTU 300. The log 1108 may also include a data logger, which is an electronic device that records data over time or in relation to location either with a built-in instrument or sensor or via external instruments and sensors. The data logger 1108 may be based on a digital processor (or computer). They data logger 1108 can be battery powered and equipped with a microprocessor, internal memory for data storage, and sensors. Some embodiments of the data logger 1108 can interface with a personal computer, and use software to activate the data logger 1108 and view and analyze the collected data, while others have a local interface device and can be used as a stand-alone device.

The data logger 1108 may vary between general purpose types for a range of measurement applications to very specific devices for measuring in one environment or application type only. It is common for general purpose types to be programmable; however, many remain as static machines with only a limited number or no changeable parameters. One of the primary benefits of using data loggers is the ability to automatically collect data on a 24-hour basis. Upon activation, data loggers are typically deployed and left unattended to measure and record information for the duration of the monitoring period. This autonomy allows for a comprehensive, accurate picture of the environmental conditions being monitored, such as air temperature and relative humidity.

A POI 1112, 1116 is a form of fiber optic technology aimed primarily at communications and networking over relatively short distances (less than 300 meters), and at high bandwidths. Parallel optic interfaces 1112, 1116 differ from traditional fiber optic communication in that data is simultaneously transmitted and received over multiple fibers. Different methods exist for splitting the data over this high bandwidth link. In the simplest form, the parallel optic link is a replacement for many serial data communication links. In the more typical application, one byte of information is split up into bits and each bit is coded and sent across the individual fibers. There may be two forms of commercially available products for POIs 1112, 1116. The first is a twelve-channel system consisting of an optical transmitter 1112 and an optical receiver 1116. The second is a four-channel transceiver product that is capable of transmitting four channels 1112 and receiving four channels 1116 in one product. Parallel optics is often the most cost effective solution for getting 40 Gigabit per second transmission of data over distances exceeding 100 meters A modem 1120 (modulator-demodulator) can be any network hardware/software that modulates one or more carrier wave signals to encode digital information for transmission and demodulates signals to decode the transmitted information. Modems can be used with any means of transmitting analog signals, from light emitting diodes to radio frequency signals. A common type of modem 1120 is one that turns the digital data of a computer into modulated electrical signal for transmission over telephone lines and demodulated by another modem at the receiver side to recover the digital data.

Data function 1124 is any software that stores, retrieves, or manages data. The LTU 300 can store sensor, position, or other information in working memory 1037, in a storage media 1031, or in a storage device 1029. The information may be managed by the data function 1124, which can include any type of file system controller or database controller.

The battery function 1128 can send information about the battery 1055 and/or receive commands to manage the battery 1055. Thus, the information about the battery function 1128 can include an amount of charge, battery status. The commands received by the battery function 1128 can manage the charging of the battery through the port 1057, signal the processor 1023 that a charge is needed when the battery 1055 reaches some threshold, etc. Any required commands to maintain battery charge, charge the battery, or use the battery may be sent by the battery function 1128 to the Batt function 1168.

A power management (PM) function 1132 can be any feature that receives commands to manage power to the LTU 300. For example, the PM 1132 can receive commands to turn off the power or switch the LTU 300 to a low-power state when inactive or while charging. Further, the PM 1132 can receive commands to manage how different other components, e.g., the sensors 1043, communications system 1033, etc. use or are allotted power. Thus, the commands received by the PM 1132 can control switches or other componentry to change power allocation. Further, the PM 1132 can receive power savings commands from the LTU server 132 to command the PMIC 1164 to change power functions, which may be sent to the PMIC function 1164.

A MUX/DEMUX 1136 can be any hardware/software that selects one of several analog or digital input signals and forwards the selected input into a single line. A multiplexer of 2n inputs has n select lines, which are used to select which input line to send to the output. MUX/DEMUX 1136 can be used to increase the amount of data that can be sent over the network within a certain amount of time and bandwidth. A MUX/DEMUX 1136 is also called a data selector. The MUX/DEMUX 1136 makes it possible for several signals to share one device or resource, for example one A/D converter or one communication line, instead of having one device per input signal. Conversely, the demultiplexer (or DEMUX) 1136 is any hardware/software taking a single input signal and selecting one of many data-output-lines, which is connected to the single input. A DEMUX 1136 is a single-input, multiple-output switch.

A High-Level Data Link Control (HDLC) 1240 may be any hardware/software that provides a bit-oriented code-transparent synchronous data link layer protocol function developed by the International Organization for Standardization (ISO). The current standard for HDLC is ISO 13239, which is incorporated by reference herein for all that it teaches and for all purposes. The HDLC 1240 provides both connection-oriented and connectionless service. In some configurations, the HDLC 1240 can be used for point to multipoint connections, but also to connect one device to another, using what is known as Asynchronous Balanced Mode (ABM). The master-slave modes Normal Response Mode (NRM) and Asynchronous Response Mode (ARM) may also be used.

The Linux Kernel 1160 can incorporate various operating system functions and include a power management integrated circuit (PMIC) function 1164, a battery (Batt) management function 1168, and/or a universal asynchronous receiver/transmitter (UART) function 1172. The operating system (OS) functions manage computer hardware and software resources and provides common services for computer programs. All computer programs, excluding firmware, require an operating system to function. The OS schedules tasks of various operations or programs for efficient use of the system 1000. For hardware functions, such as input and output and memory allocation, the operating system acts as an intermediary between programs and the computer hardware. The Linux Kernel is a type of OS, but another OS may be used in the LTU 300.

The power management integrated circuits (PMIC) 1164 can be any hardware/software for managing power requirements of the LTU 300. Thus, the PMIC 1164 can include some form of electronic power conversion and/or relevant power control functions. A PMIC 1164 can decrease the amount of space required to manage the electrical systems and/or battery function 1168. The PMIC 1164 may be responsive to commands received by the PM 1132 and may sent information to the PM 1132 for transmission to the LTU server 132. The Batt 1168 can control the battery state or function of the battery 1055. In some configurations, based on commands from the battery function 1128, the OS 1160 batt 1168 may manage or control the functioning of the battery 1055.

The UART 1172 can be a computer hardware device or software for asynchronous serial communication in which the data format and transmission speeds are configurable. The electric signaling levels and methods (such as differential signaling, etc.) may be handled by a driver circuit external to the UART 1172. The UART 1172 can be used in conjunction with communication standards such as TIA (formerly EIA) RS-232, RS-422 or RS-485. A UART 1172 may be an individual (or part of an) integrated circuit (IC) used for serial communications over a computer or peripheral device serial port. The UART 1172 may be included with the processor 1123.

The recovery function 1148 can return the LTU 300 settings to a previous version. As such, the recovery function 1148 may store LTU 300 settings and change those settings as required by LTU commands or other inputs. Different versions of the settings may be maintained and stored with version identifiers that can be retrieved or provided to the modem service 114 to send to the LTU server 132 or output to another output. A command can be received, from the LTU server 132 through the modem service 114, that instructs the recovery function 1148 to return the settings to an earlier version. The recovery function 1148 may then make those changes to the settings. The recovery function 1148 may also provide any information to the modem service 114 to allow the physical recovery of the LTU 300. In this configuration, the modem service 114 provides shipping information to a user to send the LTU 300 to a destination. In other situations, the recovery function 1148 may send a signal to the LTU server 132 providing a location of the LTU 300, such that a user can retrieve the LTU 300.

The FOTA 1152 1152 refers to various functions for receiving new software, configuration settings, and even updating encryption keys distributed from the LTU server 132 or another device. One important feature of FOTA 1152 is that a single LTU server 132 can send an update to all the LTUs 300, who are unable to refuse, defeat, or alter that update, and that the update applies immediately to everyone on the channel. In the context of the mobile content, FOTA 1152 may include over-the-air service provisioning (OTASP), over-the-air provisioning (OTAP) or over-the-air parameter administration (OTAPA), or provisioning LTUs 300 with the necessary settings with which to access services. As LTUs 300 accumulate new applications and become more advanced, LTU configuration can become increasingly important as new updates and services develop. FOTA 1152 via SMS optimizes the configuration data updates in SIM cards and enables the distribution of new software updates to LTUs 300 with the necessary settings with which to access services such as WAP or MMS. FOTA 1152 messaging may provide remote control of LTUs 300 for service and subscription activation, personalization and programming of a new service for mobile operators and third parties.

Factory 1156 can return the LTU 300 settings to a factory version. As such, the factory function 1156 may store a first or primary version of the LTU 300 settings. This primary version may be retrieved or provided to the modem service 114 to send to the LTU server 132 or output to another output. A command can be received, from the LTU server 132 through the modem service 114, that instructs the factory function 1156 to return the LTU 300 to factory settings. The factory function 1156 may then make those changes to the settings. The factory function 1156 may also provide any information to the modem service 114 to allow the physical recovery of the LTU 300. In this configuration, the factory function 1156 provides shipping information to a user to send the LTU 300 to a LTU factory or distributor. In other situations, the factory function 1156 may send a signal to the LTU server 132 providing a location of the LTU 300, such that a user can retrieve the LTU 300. Thus, the factory function 1156 can provide quick retrieval of all LTUs 300 in the event of a recall or other event.

A light-emitting diode (LED) function 1264 can be a LED circuit or LED driver that powers a LED. The circuit or function 1264 can provide sufficient current to light the LED at the required brightness, and may limit the current to prevent damaging the LED. The voltage drop across an LED is approximately constant over a wide range of operating current; therefore, a small increase in applied voltage greatly increases the current. Very simple circuits can be used for low-power indicator LEDs.

Sensor function 1272 may be a sensor interface, for example, the Simple Sensor Interface (SSI) protocol, which can include any simple communications protocol designed for data transfer between the processor 1023 and the sensors 1043. The SSI protocol, for example, is an Application layer protocol as in the OSI model. The SSI protocol has been developed jointly by Nokia, Vaisala, Suunto, Ionific, Mermit and University of Oulu. The SSI protocol can be used in point-to-point communications over UART 1172. SSI can also provide polling sensors and streaming sensor data. Sample implementation of the SSI protocol for MSP430 microcontrollers has been published in 2006 by Nokia.

The GPS function 1268 can include any drivers and/or receivers that can receive positioning information. The GPS function 1268 can relay position data to the processor 1023 using the NMEA 0183 protocol. Other proprietary protocols exist as well, such as the SiRF and MTK protocols. Receivers can interface with other devices using methods including a serial connection, USB, Bluetooth®.

Figure 13:
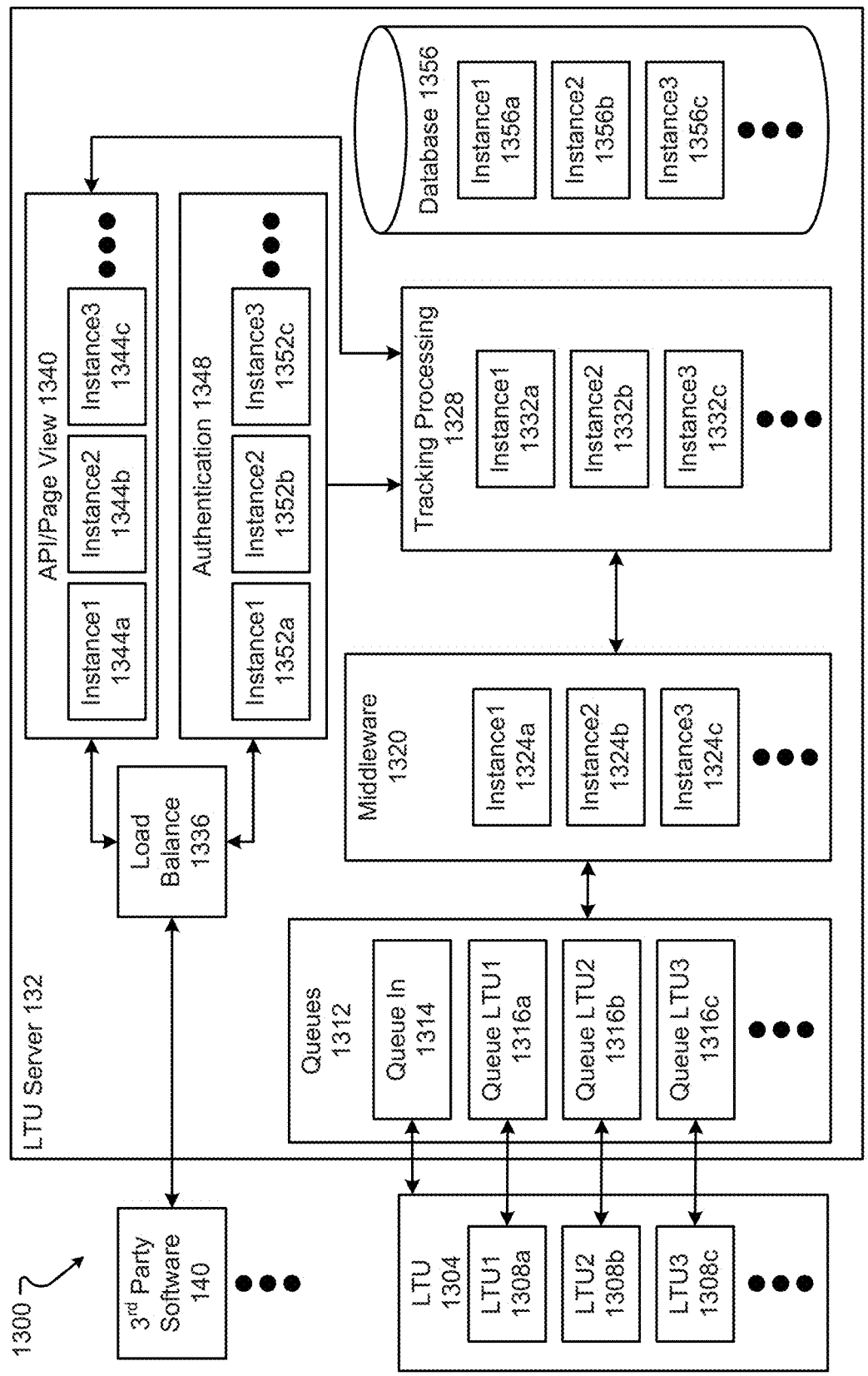
FIG. 13 shows a software/hardware diagram for the LTU server in accordance with embodiments of the present disclosure.

LTU Server Software:

The software/hardware associated with the LTU Server 132 may be as shown in FIG. 13. The LTU server 132 can manage the reception of data from several LTUs 300 and provision the data to clients 140. Each LTU 300 may be associated with a particular third-party 140, and thus, the LTU server 132 can ensure the received data is sent to the correct third-party 140. Further, the LTU server 132 can command the various LTUs 300 based on input from the third parties 140 or based on operational situations. The LTU server 132 can include one or more of, but is not limited to: one or more queues 1312, middleware 1320, tracking procession 1328, a database 1356, a load balance 1336, an application programming interface (API)/page view 1340, and/or authentication 1348.

The queue 1312 can be a kind of abstract data type or collection stored in working memory 1037 in which the entities in the collection are kept in order and the principal (or only) operations on the collection are the addition of entities to the rear terminal position, known as enqueue, and removal of entities from the front terminal position, known as dequeue. This makes the queue a First-In-First-Out (FIFO) data structure. In a FIFO data structure, the first element added to the queue will be the first one to be removed. This data structure is equivalent to the requirement that once a new element is added, all elements that were added before have to be removed before the new element can be removed. Often a peek or front operation is also entered, returning the value of the front element without dequeuing it. A queue is an example of a linear data structure, or more abstractly a sequential collection.

Queues 1312 allow data, objects, persons, commands, events, etc. to be stored and held to be processed later. In these contexts, the queue 1312 performs the function of a buffer. The queue 1312 can be implemented as data structures coupled with access routines, as an abstract data structure or in object-oriented languages as classes. Common implementations are circular buffers and linked lists.

The queue 1312 may have two or more instances 1314 through 1316*c*. As used herein, an instance can be a concrete occurrence of any object or code, existing usually during the runtime of a computer program. The queue 1312 can have a first instance 1314 to receive data from one or more LTUs 300 in an LTU group 1304. An LTU group 1304 can include all LTUs 300 or some subset of LTUs 300 organized based on a characteristic(s), e.g., a customer identity. The data may be queued to allow for provision to the middleware 1320 for further processing. Queueing the received data allows for provision to the middleware 1320 at a time coordinated with the middleware 1320.

The queue 1312 can have one of more other instances of queues 1316*a*-1316*c*, which each queue 1316 may be associated with a particular and/or predetermined LTU 1308*a*-1308*c*. The queues 1316 can queue commands to be sent to the LTUs 1308. Commands need to be queued as the LTU 1308 may not be able to communicate in some situations, e.g., the LTU 300 is out of cellular or wireless range/coverage. AS such, the queue 1316 can receive a command from the middleware 1320 and hold the command until contact with the LTU 1304 is established and the command (s) in the queue 1316 can be sent.

Figure 15:
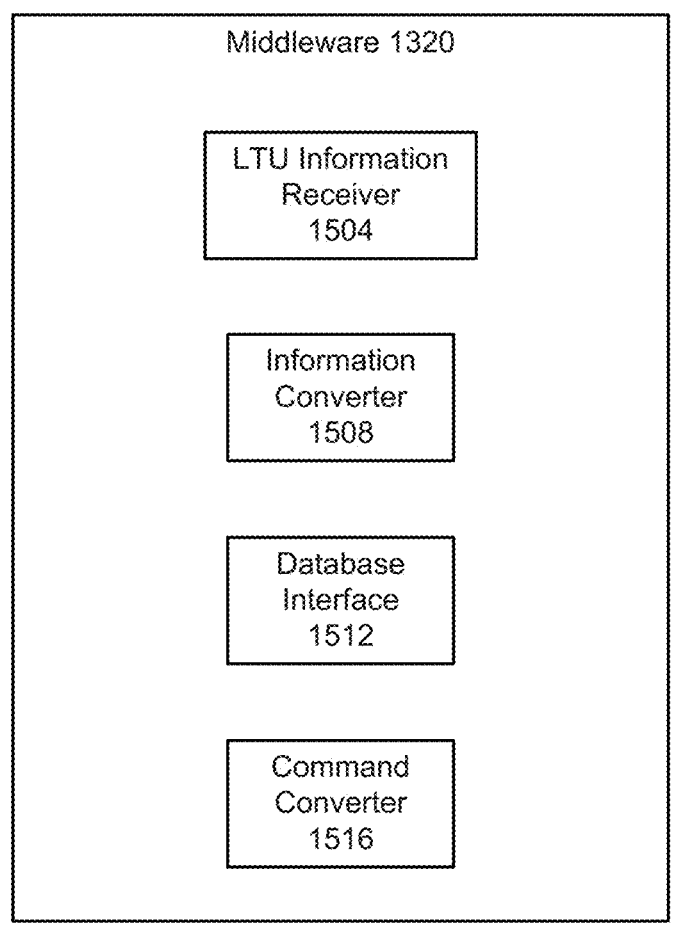
FIG. 15 shows a software/hardware diagram for the middleware function of the LTU server in accordance with embodiments of the present disclosure.

Middleware 1320 can include the software that provides services to software applications in the tracking processing 1328 beyond those available from the operating system. The middleware 1320 allows development or implementation of communication and input/output changes to occur with changing the purpose or performance of tracking processing 1328. Middleware 1320 can also include web servers, application servers, content management systems, and similar tools that support application development and delivery. An example of at least some of the functions that may be performed by an instance of the middleware 1320 may be as shown in FIG. 15. The middleware 1320 can be deployed as one or more instances 1324a-1324c that may be associated with a particular and/or predetermined LTU 1308 and/or customer 140.

Figure 16:
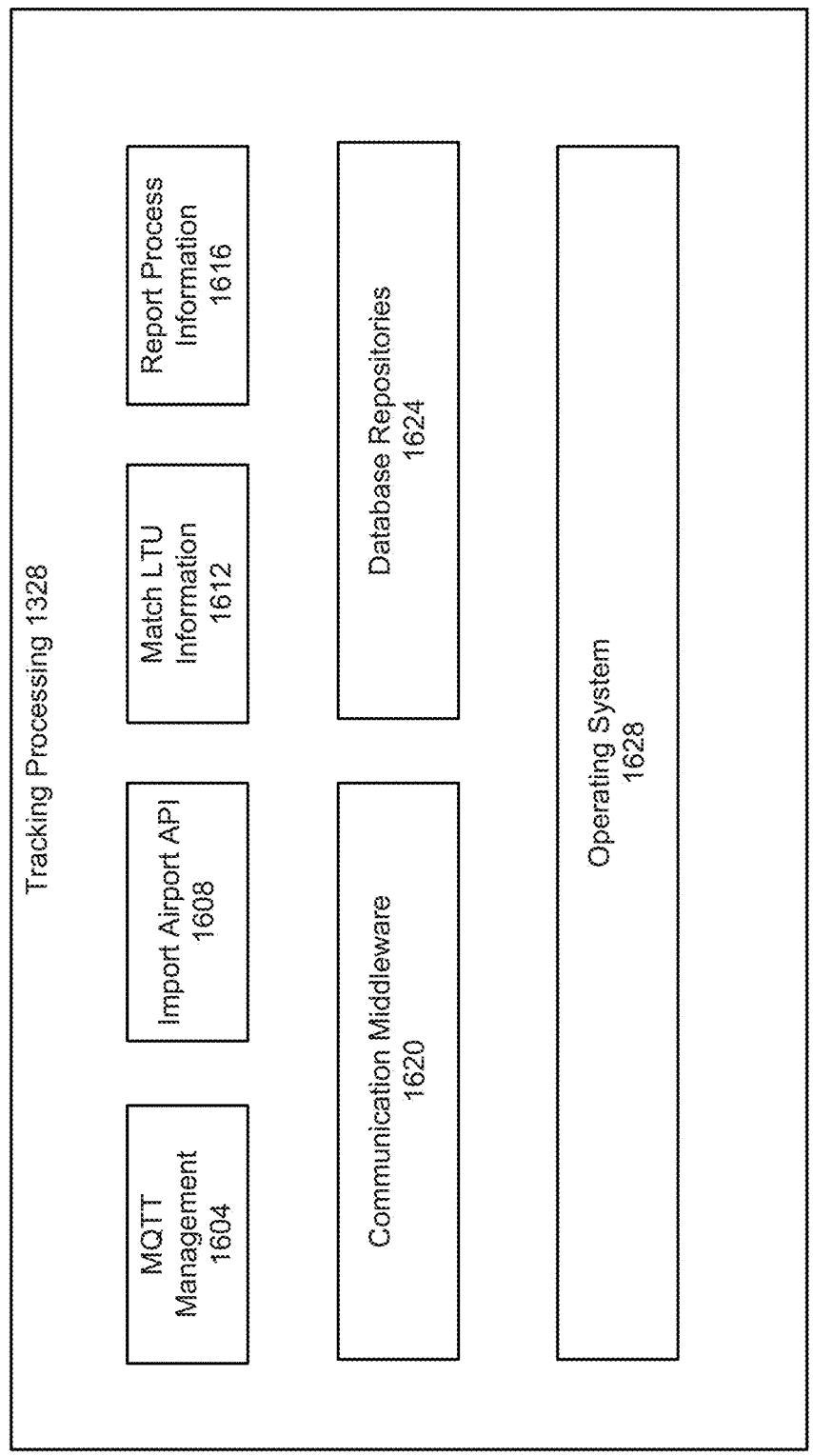
FIG. 16 shows a software/hardware diagram for the tracking processing function of the LTU server in accordance with embodiments of the present disclosure.

Tracking Processing 1328 can include application processing including business processes or other functions. Tracking processing 1328 can include related, structured activities or tasks that produce a specific service or product (serve a particular goal) for a particular customer or customers regarding tracking of assets with the LTU 300. As with the middleware 1320, the tracking processing 1328 can be deployed as one or more instances 1332a-1332c that may be associated with a particular and/or predetermined LTU 1308 and/or customer 140. An example of at least some of the functions that may be performed by an instance of the tracking processing 1328 may be as shown in FIG. 16.

Database 1356 can include any database storage or database access service. Thus, the database 1356 can include object-oriented databases, flat file databases, relational databases, or another type of database. In some situations, the database 1356 may be a database developed in SQL or other language or protocol. Regardless, the database 1356 can also include a database manager that can retrieve, store, or manage the data within the database. As with the middleware 1320 and the tracking processing 1328, the database 1356 can be deployed as one or more instances 1356a-1356c that may be associated with a particular and/or predetermined LTU 1308 and/or customer 140. Databases are well known and need not be described further herein; however, examples of data that may be stored within the database 1356 may be as provided in the description of FIG. 17.

The third-party software 140 can be a client that accesses a service made available by a the LTU server 132. The server 132 may be accessed by way of a network 136. A client can be a computer program that, as part of its operation, relies on sending a request to another computer program (e.g., the LTU server 132). For example, a web browser at the third-party computer 140 can connect to an API/page view service 1340 and retrieve web pages for display at the third-party device 140. The web pages can include LTU data about assets associated with the third-party Further, the third-party device 140 may be pushed LTU information depending on the configuration of the LTU server 132 and/or third-party device 140.

The load balance function 1336 can improve the distribution of workloads across multiple computing resources, such as the API/page view function 1340 and/or the authentication processing 1348. Load balancing 1336 aims to optimize resource use, maximize throughput, minimize response time, and avoid overload of any single resource. Using multiple components with load balancing 1336 instead of a single component may increase reliability and availability through redundancy. Load balancing 1336 can include dedicated software and/or hardware, such as a multilayer switch or a Domain Name System server process, to accomplish the load balancing. Generally, the load balance 1336 can distribute tasks across the multiple instances 1344, 1352 of the API 1340 and/or authentication functions 1348

The API/Page View 1340 can be any set of subroutine definitions, protocols, and tools for building application software. In general terms, the API/Page View 1340 is a set of clearly defined methods of communication between various software components. The API/Page View 1340 allows for development of the third-party software 140 and/or tracking processing 1328 by providing all the building blocks, which are then put together by the programmer. The API/Page View 1340 may be a web-based system, operating system, database system, computer hardware or software library. The API/Page View 1340 can take many forms, but often includes specifications for routines, data structures, object classes, variables or remote calls. POSIX, Microsoft Windows API, the C++ Standard Template Library, and Java APIs are examples of different forms of the API/Page View 1340. Further, the API/Page View 1340 can provide LTU information to the client 140 in pages or through pushing data to the client 140. As with the middleware 1320, the tracking processing 1328, and/or the database 1356, the API/Page View 1340 can be deployed as one or more instances 1344a-134c that may be associated with a particular and/or predetermined LTU 1308 and/or customer 140.

Authentication 1348 can be any hardware/software capable of confirming the truth of an attribute of a single piece of data (a datum) claimed true by an entity. Authentication 1348 is a process that confirms the identity of the client 140 and begins to establish the connection between the client 140 and the tracking processing functions 1328. Authentication 1348 might involve confirming the identity of a third-party 140 by verifying the authenticity of a website with a digital certificate, receiving and verifying a token or other security instrument, etc. In other words, authentication often involves verifying the validity of at least one form of identification.

As the weakest level of authentication, only a single component from one of the three categories of factors is used to authenticate. The use of only one factor does not offer much protection from misuse or malicious intrusion. When elements representing two factors are required for authentication, the term two-factor authentication is applied—e.g., the LTU server 132 can require users 140 to provide a password (knowledge factor) and a pseudorandom number from a security token (ownership factor). Multi-factor authentication can instead use more than two factors, e.g., multiple authentication factors are used to enhance security of an interaction in comparison to the two-factor authentication process.

The term digital authentication refers to a group of processes where the confidence for user identities is established and presented via electronic methods to an information system. It is also referred to as e-authentication. Digital authentication can include enrollment—an individual applies to a credential service provider (CSP) to initiate the enrollment process. After successfully proving the applicant's identity, the CSP allows the applicant to become a subscriber; authentication—after becoming a subscriber, the user receives an authenticator e.g., a token and credentials, such as a user name (the third-party 140 is then permitted to perform online transactions within an authenticated session with a relying party, where they must provide proof that the third-party 140 possesses one or more authenticators); and/or life-cycle maintenance—the CSP is charged with the task of maintaining the third-party's credential of the course of its lifetime, while the subscriber is responsible for maintaining his or her authenticator(s). As with the middleware 1320, the tracking processing 1328, API/Page View 1340, the authentication functions 1348 can be deployed as one or more instances 1352*a*-1352*c* that may be associated with a particular and/or predetermined LTU 1308 and/or customer 140. An example of at least some of the functions that may be performed by an instance of the authentication functions 1348 may be as shown in FIG. 14.

Figure 14:
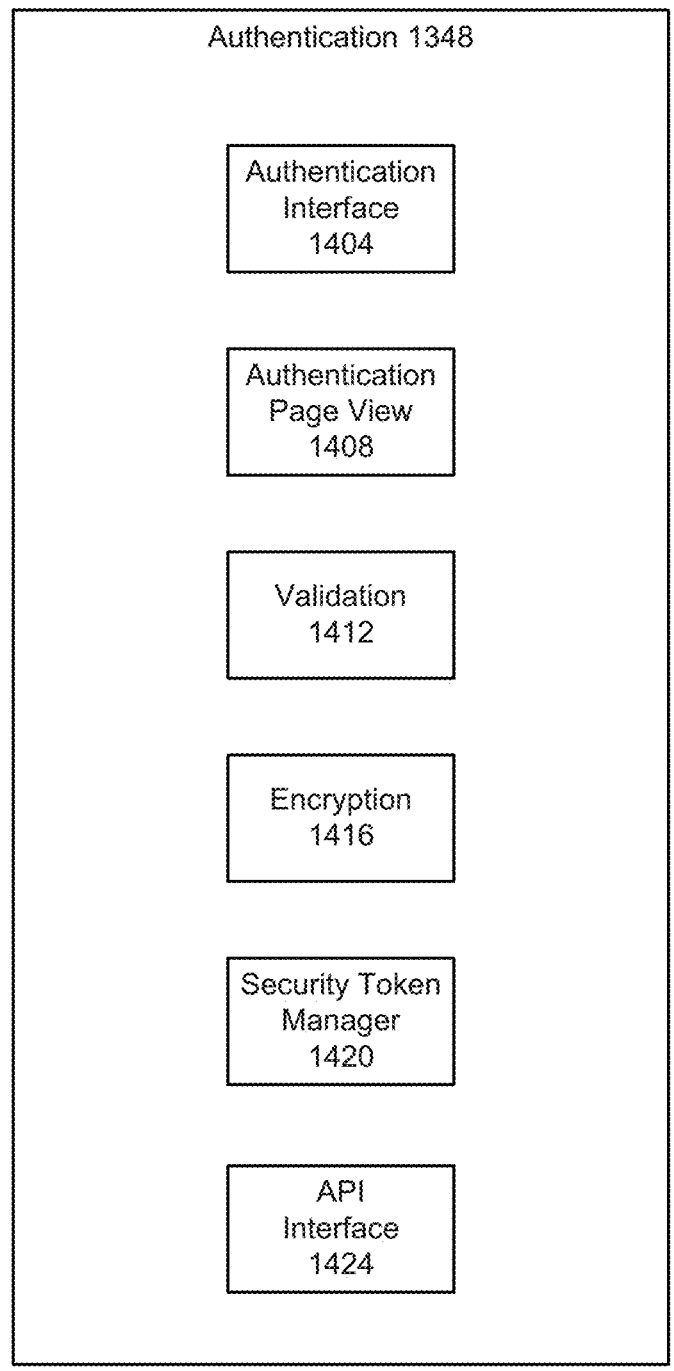
FIG. 14 shows a software/hardware diagram for the authentication function of the LTU server in accordance with embodiments of the present disclosure.

Authentication Software:

An example of functions performed by the authentication software 1348 may be as shown in FIG. 14. The functions can include an authentication interface 1404 (that receives or sends communications to the third party 140 during the authentication processing), an authentication page view 1408, a validation function 1412, an encryption function 1416, a security token manager 1420, and/or and API interface 1424 (that sends or receives communications from/to the API/Page View 1340).

The authentication page view 1408 can be a LTU server 132 function to script pages or information to the user 140. The information encompasses required input or outputs used for the development of a secret or other authentication functions. Thus, the authentication page view 1408 produces the interface used to authenticate the user 140.

Validation 1412 includes any process of ensuring that a program operates on clean, correct and useful data set. Validation 1412 can use routines, often called "validation rules" "validation constraints" or "check routines", that check for correctness, meaningfulness, and security of data that are input from the third-party system 140 and/or output to from the LTU server 132. The rules may be implemented through the automated facilities of a data dictionary, or by the inclusion of explicit application program validation logic.

Encryption 1416 can include any process of encoding and/or decoding a message or information in such a way that only authorized parties can access the content of the message. Encryption does not of itself prevent interference, but denies the intelligible content to a would-be interceptor. In an encryption scheme, the intended information or message, referred to as plaintext, is encrypted using an encryption algorithm, generating ciphertext that can only be read if decrypted. For technical reasons, an encryption scheme can use a pseudo-random encryption key generated by an algorithm. It is in principle possible to decrypt the message without possessing the key, but, for a well-designed encryption scheme, considerable computational resources and skills are required. An authorized recipient can easily decrypt the message with the key provided by the LTU server 132 to the third-party system 140 but not to unauthorized users.

An example of an encryption type are public-key encryption schemes where the encryption key is published for anyone to use and encrypt messages. However, only the receiving party has access to the decryption key that enables messages to be read. A publicly available public key encryption application called Pretty Good Privacy (PGP) was written in 1991 by Phil Zimmermann, and distributed free of charge with source code; it was purchased by Symantec in 2010 and is regularly updated and may be used for encryption 1416.

A security token manager 1420 can be any hardware/software that is used to gain access to an electronically restricted resource. The token is used in addition to or in place of a password. It acts like an electronic key to access LTU information. Some tokens may store cryptographic keys, such as a digital signature. The security token manager 1420 can be a security token service (STS), which is a software based identity provider responsible for issuing security tokens as part of a claims-based identity system. In a typical usage scenario, a client 140 requests access to a secure software application in tracking processing 1328. Instead of the application authenticating the client 140, the client 140 is redirected to a security token manager 1420. The authentication 1408 authenticates the client 140 and instructs the security token manager 1420 to issue a security token. Finally, the client 140 is redirected back to the API/Page View 1340 where it presents the security token. The token is the data record in which claims are packed, and is protected from manipulation with strong cryptography. The API/Page View 1340 or other software can verify that the token originated from the security token manager 1420 trusted by it, and then makes authorization decisions accordingly. The token is creating a chain of trust between the security token manager 1420 and the software application consuming the claims. This process is illustrated in the Security Assertion Markup Language (SAML) use case, demonstrating how single sign-on can be used to access web services.

Security token services can be offered as web services, through the use of application programming interfaces (APIs), or for native applications in conjunction with software development kits (SDKs). Broadly speaking, there are three types of Secure Token Services: IP-STS (Identity Provider Secure Token Service): authenticates clients directly; FS-STS (Federated Provider STS); and RP-STS (Relying Party Secure Token Service), which delegates client authentication.

Middleware Software:

An example of functions performed by the middleware software 1320 may be as shown in FIG. 15. The functions can include an LTU information receiver 1504 (that receives communications from an LTU information queue 1314), an information converter 1508, a database interface 1512, and/or a command converter 1516.

The information converter 1508 can convert LTU information data from one format received by the queues 1316 to another format that can be processes by the tracing processing functions 1332. Throughout the LTU 900 environment, LTU data may be encoded in a variety of ways. The operating system 1628 is predicated on certain standards for data and file handling. Furthermore, each LTU program can handle data in a different manner. Whenever any one of these variables is changed, data is converted in some way before the data can be used by a different computer, operating system, and/or program. Even different versions of these elements usually involve different data structures. For example, the changing of bits from one format to another, usually for the purpose of application interoperability or of capability of using new features, is merely a data conversion. Data conversions may be as simple as the conversion of a text file from one character encoding system to another; or more complex, such as the conversion of file formats.

There are many ways in which data is converted within the computer environment. The conversion 1508 may require processing by the use of a special conversion program, or it may involve a complex process of going through intermediary stages, or involving complex "exporting" and "importing" procedures, which may include converting to and from a tab-delimited or comma-separated text file, etc. In some cases, the converter 1508 may recognize several data file formats at the data input stage and then is also capable of storing the output data in a number of different formats. The converter 1508 may be used to convert a file format. If the source format or target format is not recognized, then at times a third program may be available which permits the conversion to an intermediate format, which can then be reformatted using the first program. There are many possible scenarios. Regardless, the converter 1508 converts information from the LTUs 300 into a usable form for the tracking processing 1328. It should be noted that the command converter 1516 may function similarly but convert commands from the tracking processing 1328 into a format understood by the LTUs 1308 before send the converted commands to queue 1316.

The database interface 1512 can manage an organized collection of data, for example, database 1356. The database interface 1512 may be a database management system (DBMS), which is a computer software application that interacts with other applications and the database itself to capture and analyze data. A general-purpose DBMS is designed to allow the definition, creation, querying, update, and administration of databases. Well-known DBMSs include MySQL, PostgreSQL, MongoDB, MariaDB, Microsoft SQL Server, Oracle, Sybase, SAP HANA, MemSQL and IBM DB2. A database is not generally portable across different DBMSs, but different DBMS can interoperate by using standards such as SQL and ODBC or JDBC to allow a single application to work with more than one DBMS. Database management systems are often classified according to the database model that they support; the most popular database systems since the 1980s have all supported the relational model as represented by the SQL language.

Tracking Processing Software:

An example of functions performed by the tracking processing software 1328 may be as shown in FIG. 16. The functions can include a Message Queue Telemetry Transport (MQTT) Management 1604, an import airport API 1608, a match LTU information 1612, a report process information 1616, a communication middleware 1620, a database repositories 1624, and/or an operation system (OS) 1628.

The MQTT Management 1604 can include a messaging function based on the ISO standard (ISO/IEC PRF 20922) publish-subscribe-based "lightweight" messaging protocol for use on top of the TCP/IP protocol. MQTT Management function 1604 can communicate over connections with remote locations where a "small code footprint" is required or the network bandwidth is limited, as with the LTU environment 900. The publish-subscribe messaging pattern requires a message broker, e.g., the MQTT Management 1604. The MQTT Management 1604 may be responsible for distributing messages to interested clients based on the topic of a message. Alternative protocols include the Advanced Message Queuing Protocol (AMQP), Streaming Text Oriented Messaging Protocol (STOMP) the IETF Constrained Application Protocol, 16MPP, and Web Application Messaging Protocol (WAMP).

The import airport API 1608 can be an API that imports information about airports, airport communications infrastructure, or other environmental communications systems. The import airport API 1608 can also import LTU information or other information for provision to the client 140. Also, the import airport API 1608 can interface with systems to send/receive processed LTU information destined for the client 140.

The match LTU information function 1612 can function to associated a client 140 with a particular LTU 300. As such, the match LTU information function 1612 can create the associated of identifiers for the LTU 300 and client 140. Further, the match LTU information function 1612 can determine, based on the associations, which LTU data is to be sent to each client 140. The match LTU information function 1612 then can instruct the routing of the LTU information for the communication middleware 1520 or other communication function.

The report process information 1616 can generate the reports of the LTU information for the client 140. As such, based on any processing rules predetermined by the LTU server 132 or provided from the client 140, the report process information 1616 can organize and present the LTU information to the client.

Communication middleware 1620 provides the communications capabilities to communicate with other system components or other systems or devices, e.g., the client 140 and/or LTU 300. The communication middleware 1620 can have similar functionality to middleware 1320 described in conjunction with FIGS. 13 and 15.

Database repositories 1624 functions to interact with the database interface 1512 or database 1356 to store, retrieve, or manage LTU data associated with a client 140. As such, the Database repositories 1624 can receive LTU data and store that data for provision to the report process information function 1616 that will use the data to generate reports.

The operation system (OS) 1628 may be the same or similar to the operating system 1160 or may perform similar functions to the OS 1160 described in conjunction with FIGS. 11 and 12.

Figure 17:
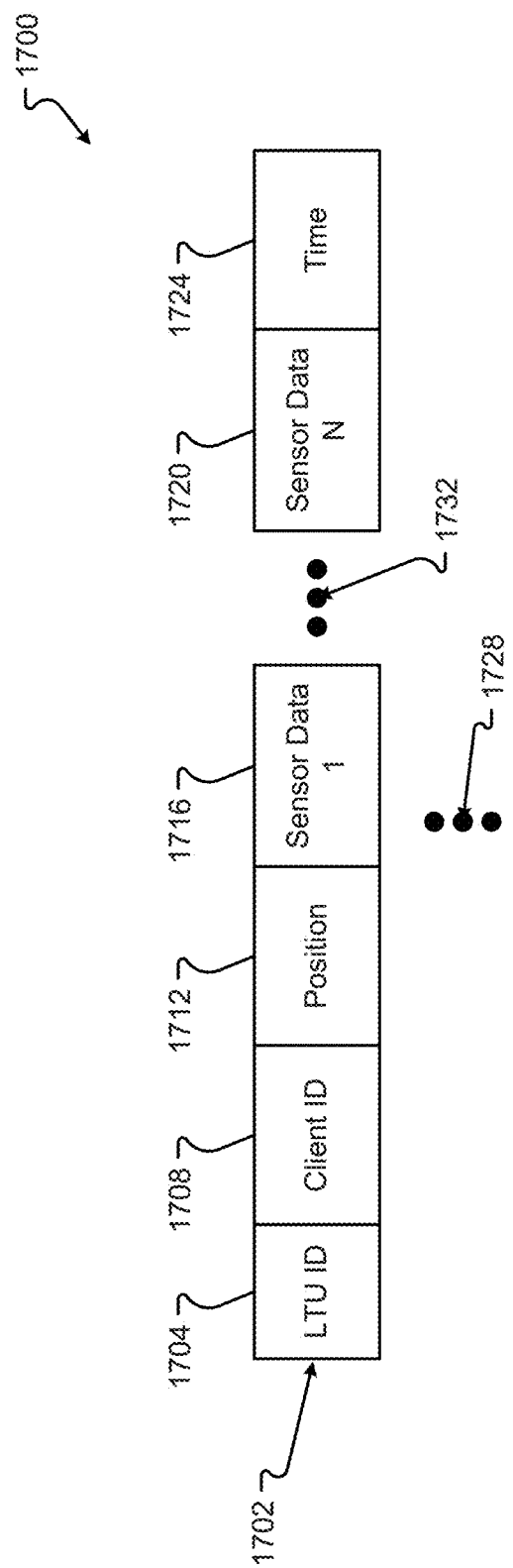
FIG. 17 shows a block diagram of data that may be communicated, stored, and/or retrieved by the LTU or other systems herein in accordance with embodiments of the present disclosure.

Communications Data:

An embodiment of a data structure 1702 or database information 1700 that includes information about LTU location and/or condition that may be stored in database 1356, may be as shown in FIG. 17. The information within database 1700 can include one or more fields, but is not limited to those shown in FIG. 17, as represented by ellipses 1732. Further, there can be more records, each associated with a client 140 and/or LTU 300, than those shown in FIG. 17, as represented by ellipses 1728.

The LTU identifier field 1704 can include the identifier for each of the LTUs 300 that are part of the LTU system 100 and or active therein. As such, the database 1700 shows only a single record for one active LTU within the environment 100. However, there may be two or more records provided, within the database 1700, as represented by ellipses 1728. Two or more LTU ID's 1704 can be associated with a single client identifier 1708. This client identifier 1708 may identify the client 140 associated with the asset that is being tracked by the LTU 300. The IDs 1704, 1708 may be associated by the match LTU information function 1612. Either node 1704, 1708 can include any kind of numeric, alpha numeric, GUID, or other designator that uniquely identifies the LTU 300 or client 140 from all other LTUs 300 or clients 140 within the environment 100.

The rest of the data 1702 may be a minimal set of data that may be exchanged between the LTU 300 and the LTU server 132 and then sent to the third-party system 140. Due to requirements to prevent overuse of the battery and for quick messaging on crowded networks 136, the LTU 300 is required to send only a minimal amount of data to have the LTU's position and condition known. Thus, there is a minimal amount of information that may be provided in any message 1700. For example, the message 1700 can include a position 1712, a time/date 1724, and one or more items of sensor data 1716, 1720, if needed. Each of these fields may be provided in a communication to the LTU server 132, which may store the data and provide the data to the third-party 140.

The position 1712 can be a position or location indicator determined from GPS or other location data. The position 1712 can be coordinate-based information associated with a latitude and/or longitude, a determined address, an IP address, an altitude, etc. This information on position 1712 may be send periodically, e.g., every 5 minutes, every hour, etc. The periodicity of the communication of position information may be predetermined or user-established. In some situations, the periodicity of sending the position information 1712 can be based on the current state of the LTU 300. For example, a faster travel medium, e.g., an airplane, may require more frequent updates than a ship or vehicle. Further, if the LTU 300 is beginning or ending a trip, the periodicity may become more frequent. If the LTU 300 has remained motionless, as if abandoned, the periodicity of position updates may become more infrequent to preserve battery power. Thus, numerous factors are considered by the LTU 300 or the LTU server 132 in setting the periodicity of position information 1712 updates.

Optionally, one or more sensor data 1716, 1720 may also be sent in the message 1702. The sensor data 1716, 1720 can be any data from sensors 1043 as explained in conjunction with FIG. 10. Thus, if a change has been determined by a sensor 1043, a message 1702 with the changes sensor data 1716 may be included. The change may need to cross a threshold before being sent or may be sent regardless of the degree of change. Further, if the LTU 300 is beginning or ending a trip, the number or periodicity of the sensor data measurements 1716, 1720 being sent may become more frequent. If the LTU 300 has remained motionless, as if abandoned, an update of all sensor measurements 1716, 1720 may be sent. Thus, numerous factors are considered by the LTU 300 or the LTU server 132 in determining which and how often sensor measurements are sent, retrieved, and or provided to the client 140.

The features of the various embodiments described herein are not intended to be mutually exclusive. Instead, features and aspects of one embodiment may be combined with features or aspects of another embodiment. Additionally, the description of a particular element with respect to one embodiment may apply to the use of that particular element in another embodiment, regardless of whether the description is repeated in connection with the use of the particular element in the other embodiment.

Examples provided herein are intended to be illustrative and non-limiting. Thus, any example or set of examples provided to illustrate one or more aspects of the present disclosure should not be considered to comprise the entire set of possible embodiments of the aspect in question. Examples may be identified by the use of such language as "for example," "such as," "by way of example," "e.g.," and other language commonly understood to indicate that what follows is an example.

The systems and methods of this disclosure have been described in relation to the connection of a battery to a cooling plate. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Embodiments of the present disclosure include a tracking device, comprising: a housing having an electronics receiving cavity; a battery disposed at least partially within the electronics receiving cavity of the housing and in a first plane parallel to a surface of the housing; a first communications antenna configured to emit radio signals in a first frequency range, the first communications antenna disposed at least partially within the housing and in the first plane; and a second communications antenna configured to emit radio signals in a second frequency range, the second communications antenna disposed at least partially within the housing and in the first plane, wherein a portion of the battery is disposed in a space between the first communications antenna and the second communications antenna, wherein the portion of the battery interrupts a radio frequency signal path between the first communications antenna and the second communications antenna.

Any of the one or more of the above aspects wherein the battery includes stacked layers of anode and cathode material, and wherein the stacked layers form a shield blocking radio frequency interference between the first communications antenna and the second communications antenna.

Any of the one or more of the above aspects wherein the battery has an electromagnetic field surrounding a portion of the battery, and wherein the electromagnetic field interrupts the radio frequency signal path between the first communications antenna and the second communications antenna.

Any of the one or more of the above aspects wherein the first communications antenna and the second communications antenna are mounted to a first side of a substantially planar printed circuit board.

Any of the one or more of the above aspects wherein the printed circuit board is configured as an L-shaped board, the first communications antenna being attached adjacent to a first end of the L-shaped board and the second communications antenna being attached adjacent to a second end of the L-shaped board diagonally opposite the first end.

Any of the one or more of the above aspects wherein the first communications antenna is mounted in an orientation orthogonal to an orientation of the second communications antenna.

Any of the one or more of the above aspects wherein the first frequency range includes at least one frequency within the second frequency range.

Any of the one or more of the above aspects wherein the first communications antenna is a global system for mobile (GSM) communication systems antenna.

Any of the one or more of the above aspects wherein the second communications antenna is a global positioning system (GPS) antenna.

Any of the one or more of the above aspects further comprising: at least one radio frequency shield disposed in the space between the first communications antenna and the second communications antenna.

Any of the one or more of the above aspects wherein the housing is a substantially rectangular three-dimensional shape, and wherein the first communications antenna and the second communications antenna are mounted in opposing corners of the housing.

Embodiments of the present disclosure further include a tracking unit, comprising: a split-housing including a cover interconnected with a base; an electrical subassembly disposed within the split-housing, the electrical subassembly comprising: a printed circuit board; a battery electrically interconnected to the printed circuit board; a first communications antenna configured to emit radio signals at a first frequency, the first communications antenna attached to the printed circuit board; a second communications antenna configured to emit radio signals at a second frequency, the second communications antenna attached to the printed circuit board, wherein a portion of the battery is disposed in a space between the first communications antenna and the second communications antenna, and wherein the portion of the battery interrupts a radio frequency signal path between the first communications antenna and the second communications antenna.

Any of the one or more of the above aspects wherein the cover and the base are interconnected with one another via at least one fastening element and a sealing element.

Any of the one or more of the above aspects wherein the first frequency and the second frequency are within 100 MHz of each other.

Any of the one or more of the above aspects further comprising: a temperature sensor connected to the printed circuit board and configured to measure and record a temperature of the tracking unit.

Any of the one or more of the above aspects further comprising: a pressure sensor connected to the printed circuit board and configured to measure and record a pressure of an environment surrounding the tracking unit.

Any of the one or more of the above aspects further comprising: a light sensor connected to the printed circuit board and configured to measure and record an ambient light level surrounding at least a portion of the tracking unit.

Any of the one or more of the above aspects wherein the light sensor is one of a photodiode, phototransistor, or photoresistor.

Any of the one or more of the above aspects wherein the first communications antenna and the second communications antenna are mounted at opposing corners of the printed circuit board.

Embodiments of the present disclosure further include a printed circuit board assembly for a tracking device, comprising: a substantially planar L-shaped substrate having a first portion running in a first direction and a second portion running in a second direction orthogonal to the first direction, wherein a first communications antenna configured to emit radio signals in a first frequency range is attached to the first portion, wherein a second communications antenna configured to emit radio signals in a second frequency range is attached to the second portion, wherein the first communications antenna is mounted in an transmitting orientation orthogonal to a transmitting orientation of the second communications antenna, wherein the first communications antenna is separated from the second communications antenna by an open space disposed between the first and second portions of the substantially planar L-shaped substrate, and wherein the open space is sized to receive a substantially planar battery.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A tracking device, comprising:
    a housing having an electronics receiving cavity;
    a printed circuit board disposed within the housing and comprising an L-shaped substrate having a first edge running a first length along a first direction from a first point to a second point and a second edge joined to the first edge at the second point and running a second length along a second direction arranged orthogonal to the first direction from the second point to a third point, wherein the L-shaped substrate comprises a void disposed between the first point and the third point;
    a battery disposed in the void at least partially within the electronics receiving cavity of the housing and in a first plane parallel to a surface of the housing;
    a first communications antenna attached to the printed circuit board adjacent to the first point, the first communications antenna configured to emit radio signals in a first frequency range, the first communications antenna disposed at least partially within the housing and in the first plane; and
    a second communications antenna attached to the printed circuit board adjacent to the third point, the second communication antenna configured to emit radio signals in a second frequency range, the second communications antenna disposed at least partially within the housing and in the first plane, wherein a portion of the battery disposed in the void between the first communications antenna and the second communications antenna interrupts a radio frequency signal path between the first communications antenna and the second communications antenna, wherein the first communications antenna and the second communications antenna are mounted to a first side of the printed circuit board, and wherein the printed circuit board is substantially planar.

2. The tracking device of claim 1, wherein the battery includes stacked layers of anode and cathode material, and wherein the stacked layers form a shield blocking radio frequency interference between the first communications antenna and the second communications antenna.

3. The tracking device of claim 1, wherein the battery has an electromagnetic field surrounding a portion of the battery, and wherein the electromagnetic field interrupts the radio frequency signal path between the first communications antenna and the second communications antenna.

4. The tracking device of claim 1, wherein radio frequency shielding separate and apart from the first communications antenna, the second communications antenna, and the battery is disposed on the printed circuit board along the radio frequency signal path running from the first communications antenna to the second communications antenna.

5. The tracking device of claim 4, wherein the first communications antenna is mounted in an orientation orthogonal to an orientation of the second communications antenna.

6. The tracking device of claim 5, wherein the first frequency range includes at least one frequency within the second frequency range.

7. The tracking device of claim 6, wherein the first communications antenna is a global system for mobile (GSM) communication systems antenna.

8. The tracking device of claim 7, wherein the second communications antenna is a global positioning system (GPS) antenna.

9. The tracking device of claim 8, wherein the radio frequency shielding comprises:
a single-piece compartmentalized shielding frame made from at least one of a metallized molded plastic and a sheet metal part.

10. The tracking device of claim 9, wherein the housing is a substantially rectangular three-dimensional shape, and wherein the first communications antenna and the second communications antenna are mounted in opposing corners of the housing.

11. A tracking unit, comprising:
a split-housing including a cover interconnected with a base;
an electrical subassembly disposed within the split-housing, the electrical subassembly comprising:
a printed circuit board comprising an L-shaped substrate having a first edge running a first length along a first direction from a first point to a second point and a second edge joined to the first edge at the second point and running a second length along a second direction arranged orthogonal to the first direction from the second point to a third point, wherein the L-shaped substrate comprises a void disposed between the first point and the third point, and wherein the printed circuit board is substantially planar;
a battery disposed in the void and electrically interconnected to the printed circuit board;
a first communications antenna configured to emit radio signals at a first frequency, the first communications antenna attached to the printed circuit board adjacent to the first point;
a second communications antenna configured to emit radio signals at a second frequency, the second communications antenna attached to the printed circuit board adjacent to the third point, wherein a portion of the battery disposed in the void between the first communications antenna and the second communications antenna interrupts a radio frequency signal path running from the first communications antenna to the second communications antenna, wherein the first communications antenna and the second communications antenna are mounted to a first side of the printed circuit board.

12. The tracking unit of claim 11, wherein the cover and the base are interconnected with one another via at least one fastening element and a sealing element.

13. The tracking unit of claim 12, wherein the first frequency and the second frequency are within 100 MHz of each other.

14. The tracking unit of claim 12, further comprising:
a temperature sensor connected to the printed circuit board and configured to measure and record a temperature of the tracking unit.

15. The tracking unit of claim 14, further comprising:
a pressure sensor connected to the printed circuit board and configured to measure and record a pressure of an environment surrounding the tracking unit.

16. The tracking unit of claim 15, further comprising:
a light sensor connected to the printed circuit board and configured to measure and record an ambient light level surrounding at least a portion of the tracking unit.

17. The tracking unit of claim 16, wherein the light sensor is one of a photodiode, phototransistor, or photoresistor.

18. The tracking unit of claim 16, wherein the split-housing is a substantially rectangular three-dimensional shape, and wherein the first communications antenna and the second communications antenna are mounted at opposing corners of the substantially rectangular three-dimensional shape.

19. A printed circuit board assembly for a tracking device, comprising:
a substantially planar L-shaped substrate having a first edge running a first length along a first direction from a first point to a second point and a second edge joined to the first edge at the second point and running a second length along a second direction arranged orthogonal to the first direction from the second point to a third point, wherein the substantially planar L-shaped substrate comprises a void disposed between the first point and the third point, wherein a first communications antenna configured to emit radio signals in a first frequency range is attached to the substantially planar L-shaped substrate adjacent to the first point, wherein a second communications antenna configured to emit radio signals in a second frequency range is attached to the substantially planar L-shaped substrate adjacent to the third point, wherein the first communications antenna is mounted in an transmitting orientation orthogonal to a transmitting orientation of the second communications antenna, wherein the first communications antenna is separated from the second communications antenna by the void disposed along a line between the first point and the third point of the substantially planar L-shaped substrate, wherein radio frequency shielding that is separate and apart from the first communications antenna and the second communications antenna is disposed on the substantially planar L-shaped substrate along the line running from the first point to the third point, wherein the radio frequency shielding interrupts a radio frequency signal path between the first communications antenna and the second communications antenna, and wherein the void is sized to receive a substantially planar battery.

20. The printed circuit board assembly of claim 19, wherein the radio frequency shielding comprises:
   a single-piece compartmentalized shielding frame made from at least one of a metallized molded plastic and a sheet metal part.

* * * * *